United States Patent
Takeda et al.

(10) Patent No.: US 9,882,694 B2
(45) Date of Patent: Jan. 30, 2018

(54) RADIO BASE STATION, USER TERMINAL, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Qin Mu, Beijing (CN); Liu Liu, Beijing (CN); Lan Chen, Beijing (CN)

(73) Assignee: NIT DOCOMO, INC., Tokyo (JP)

( * ) Notice: Subject to any disclaimer, the term of this patent is extended or adjusted under 35 U.S.C. 154(b) by 0 days.

(21) Appl. No.: 14/439,922

(22) PCT Filed: Oct. 28, 2013

(86) PCT No.: PCT/JP2013/079065
§ 371 (c)(1),
(2) Date: Apr. 30, 2015

(87) PCT Pub. No.: WO2014/069381
PCT Pub. Date: May 8, 2014

(65) Prior Publication Data
US 2015/0295690 A1 Oct. 15, 2015

(30) Foreign Application Priority Data
Nov. 2, 2012 (JP) .................. 2012-243062

(51) Int. Cl.
*G01R 31/08* (2006.01)
*H04L 5/14* (2006.01)
(Continued)

(52) U.S. Cl.
CPC ......... *H04L 5/0053* (2013.01); *H04B 7/0452* (2013.01); *H04L 5/0094* (2013.01); *H04W 72/042* (2013.01); *H04W 72/0453* (2013.01)

(58) Field of Classification Search
CPC .. H04L 5/0053; H04B 7/0452; H04W 72/042; H04W 72/0458
See application file for complete search history.

(56) References Cited

U.S. PATENT DOCUMENTS

2009/0316915 A1* 12/2009 Streich ................ G10H 1/0008
381/56
2013/0100901 A1* 4/2013 Shan .................... H04L 5/0048
370/329

(Continued)

FOREIGN PATENT DOCUMENTS

WO    2010053984 A2    5/2010

OTHER PUBLICATIONS

International Search Report issued in PCT/JP2013/079065 dated Nov. 19, 2013 (2 pages).

(Continued)

*Primary Examiner* — Faruk Hamza
*Assistant Examiner* — Abu-Sayeed Haque
(74) *Attorney, Agent, or Firm* — Osha Liang LLP

(57) ABSTRACT

In order to enable notification of radio resources that make up an enhanced downlink control channel, a radio base station that transmits downlink control information for a user terminal using an enhanced downlink control channel frequency-division-multiplexed with a downlink shared data channel is provided. The radio base station includes a configuring section that configures the user terminal with a resource set including a plurality of resource blocks allocated to the enhanced downlink control channel; and a notifying section that notify the user terminal of pattern information of the resource blocks that make up the resource set and information indicating a number (n) of resource blocks that make up the resource set.

7 Claims, 21 Drawing Sheets

(51) Int. Cl.
  *H04B 7/00*    (2006.01)
  *H04J 3/00*    (2006.01)
  *H04L 5/00*    (2006.01)
  *H04W 72/04*   (2009.01)
  *H04B 7/0452*  (2017.01)

(56) References Cited

U.S. PATENT DOCUMENTS

| | | | |
|---|---|---|---|
| 2013/0188566 A1* | 7/2013 | Zhu | H04W 72/042 370/329 |
| 2013/0201926 A1* | 8/2013 | Nam | H04L 1/1685 370/329 |
| 2013/0215835 A1* | 8/2013 | Chen | H04W 72/0406 370/329 |
| 2013/0230015 A1* | 9/2013 | Hoymann | H04L 5/0053 370/329 |
| 2013/0294354 A1* | 11/2013 | Zhang | H04W 72/04 370/329 |
| 2014/0022829 A1* | 1/2014 | Shi | H02M 1/4258 363/84 |

OTHER PUBLICATIONS

NTT DOCOMO; "PRB Indication for EPDCCH"; 3GPP TSG RAN WG1 Meeting #71, R1-124844; New Orleans, USA; Nov. 12-16, 2012 (3 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN); (Release 8)"; Dec. 2008 (18 pages).

Extended Search Report issued in corresponding European Application No. 13851206.6, dated May 3, 2016 (9 pages).

3GPP TS 36.211 V11.0.0; "3rd Generation Partnership Project; Technical Specification Group Radio Access Network; Evolved Universal Terrestrial Radio Access (E-UTRA); Physical Channels and Modulation (Release 11)"; Dec. 2009 (106 pages).

Panasonic; "Indication to the UE of ePDCCH PRB pairs and PDSCH resources"; 3GPP TSG RAN WG1 Meeting #70, R1-123288; Qingdao, China; Aug. 13-17, 2012 (3 pages).

Catt; "E-PDCCH set configuration"; 3GPP TSG RAN WG1 Meeting #70bis, R1-124102; San Diego, USA; Oct. 8-12, 2012 (5 pages).

* cited by examiner

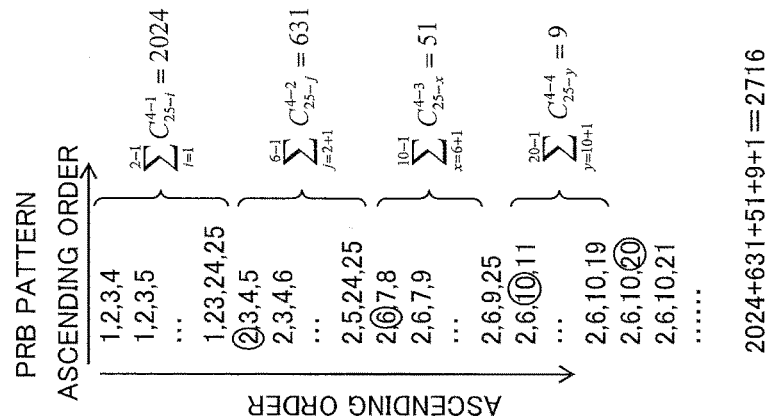
FIG. 11A / FIG. 11B

CALCULATION PROCESSING IN USER TERMINAL UE

PARAMETERS:
N: 25 (TOTAL NUMBER OF PRB)
n: 4 (NUMBER OF PRB IN EPDCCH SET)
INDEX: 2716

RECOVER THE PATTERN

FIND A1 TO SATISFY $\sum_{i=1}^{A_1-1} C_{N-i}^{n-1} \leq index \leq \sum_{i=1}^{A_1} C_{N-i}^{n-1}$ ... FORMULA (2-1)

$\sum_{i=1}^{2-1} C_{25-i}^{4-1} \leq 2716 \leq \sum_{i=1}^{2} C_{25-i}^{4-1}$ → $\underline{A1=2}$ FIND A2 TO SATISFY $\sum_{j=A_1+1}^{A_2-1} C_{N-j}^{n-2} \leq index - \sum_{i=1}^{A_1-1} C_{N-i}^{n-1} \leq \sum_{j=A_1+1}^{A_2} C_{N-j}^{n-2}$ ... FORMULA (2-2)

$\sum_{j=2+1}^{6-1} C_{25-j}^{4-2} \leq 2716 - 2024 \leq \sum_{j=2+1}^{6} C_{25-j}^{4-2}$ → $\underline{A2=6}$ FIND A3 TO SATISFY $\sum_{x=A_2+1}^{A_3-1} C_{N-x}^{n-3} \leq index - \sum_{i=1}^{A_1-1} C_{N-i}^{n-1} - \sum_{j=A_1+1}^{A_2-1} C_{N-j}^{n-2} \leq \sum_{x=A_2+1}^{A_3} C_{N-x}^{n-3}$ ... FORMULA (2-3)

$\sum_{x=6+1}^{10-1} C_{25-x}^{4-3} \leq 2716 - 2024 - 631 \leq \sum_{x=6+1}^{10} C_{25-x}^{4-3}$ → $\underline{A3=10}$ FIND A4 TO SATISFY $\sum_{y=A_3+1}^{A_4-1} C_{N-y}^{n-4} \leq index - \sum_{i=1}^{A_1-1} C_{N-i}^{n-1} - \sum_{j=A_1+1}^{A_2-1} C_{N-j}^{n-2} - \sum_{x=A_2+1}^{A_3-1} C_{N-x}^{n-3} \leq \sum_{y=A_3+1}^{A_4} C_{N-y}^{n-4}$ ... FORMULA (2-4)

$\sum_{y=10+1}^{20-1} C_{25-y}^{4-4} \leq 2716 - 2024 - 631 - 51 \leq \sum_{y=10+1}^{20} C_{25-y}^{4-4}$ → $\underline{A4=20}$ $\underline{\text{THE PRB PATTERN IS 2,6,10,20}}$

FIG.12

RADIO BASE STATION, USER TERMINAL, RADIO COMMUNICATION SYSTEM AND RADIO COMMUNICATION METHOD

TECHNICAL FIELD

The present invention relates to a radio base station, a user terminal, a radio communication system and a radio communication method in a next-generation radio communication system.

BACKGROUND ART

In a UMTS (Universal Mobile Telecommunications System) network, for the purposes of further increasing data rates and providing low delay and so on, long-term evolution (LTE) has been under study (see Non-Patent Literature 1). In LTE, as multi access schemes, OFDMA (OrthogonalFrequency Division MultipleAccess) isadopted for the downlink and SC-FDMA (Single Carrier Frequency Division Multiple Access) is adopted for the uplink.

In addition, for the purposes of achieving further broadbandization and higher speeds, a successor system to LTE has been under study (which may be called, for example, LTE Advanced or LTE Enhancement (hereinafter referred to as"LTE-A")). In LTE (Rel. 8) and LTE-A (Rel. 9 and later), MIMO (Multi Input Multi Output) technique has been also considered as a radio communication technique for transmitting and receiving data via a plurality of antennas thereby to improve a spectrum efficiency. In this MIMO technique, a transmission/reception device is equipped with a plurality of transmission/reception antennas, and different transmission information sequences are transmitted simultaneously from the different transmission antennas.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In the LTE-A system or any future systems, study has been made about multiple user MIMO (MU-MIMO) transmission in which transmission information sequences are simultaneously transmitted from different transmission antennas to different users. This MU-MIMO transmission is applied to Hetnet (Heterogeneous network) and CoMP (Coordinated Multi-Point) transmission. On the other hand, in these future systems, there may be a problem that due to shortage in capacity of downlink control channel to transmit downlink control information, it is difficult to make full use of the system performance of MU-MIMO transmission and the like.

In view of this, consideration is given to extending a radio resource region for downlink control channel to transmit more downlink control information. In such a case, there arises a problem of how to notify a user terminal of radio resources that make up an enhanced downlink control channel.

The present invention has been made in view of the foregoing and aims to provide a radio base station, a user terminal, a radio communication system and a radio communication method that are suitable for notification of radio resources that make up an enhanced downlink control channel.

Solution to Problem

A first aspect of the present invention is a radio base station that transmits downlink control information for a user terminal using an enhanced downlink control channel frequency-division-multiplexed with a downlink shared data channel, the radio base station comprising: a configuring section that configures the user terminal with a resource set including a plurality of resource blocks allocated to the enhanced downlink control channel; and a notifying section that notify the user terminal of pattern information of the resource blocks that make up the resource set and information indicating a number (n) of resource blocks that make up the resource set.

A second aspect of the present invention is a user terminal that receives downlink control information from a radio base station using an enhanced downlink control channel frequency-division-multiplexed with a downlink shared data channel, the user terminal comprising: a receiving section that, when the user terminal is configured with a resource set including a plurality of resource blocks allocated to the enhanced downlink control channel, receives, from the radio base station, pattern information of the resource blocks that make up the resource set and information indicating a number (n) of resource blocks that make up the resource set; and a specifying section that specifies the resource blocks based on the pattern information and the number (n) of resource blocks.

Technical Advantage of the Invention

According to the present invention, it is possible to provide a radio base station, a user terminal, a radio communication system and a radio communication method that are suitable for notification of radio resources that make up an enhanced downlink control channel.

BRIEF DESCRIPTION OF THE DRAWINGS

FIG. 11 provides diagrams each illustrating an example of calculation of PRB pattern indexes according to the first embodiment;

FIG. 12 is a diagram illustrating an example of specifying PRB pairs that make up an enhanced PDCCH set according to the first embodiment;

DESCRIPTION OF EMBODIMENTS

Figure 1:
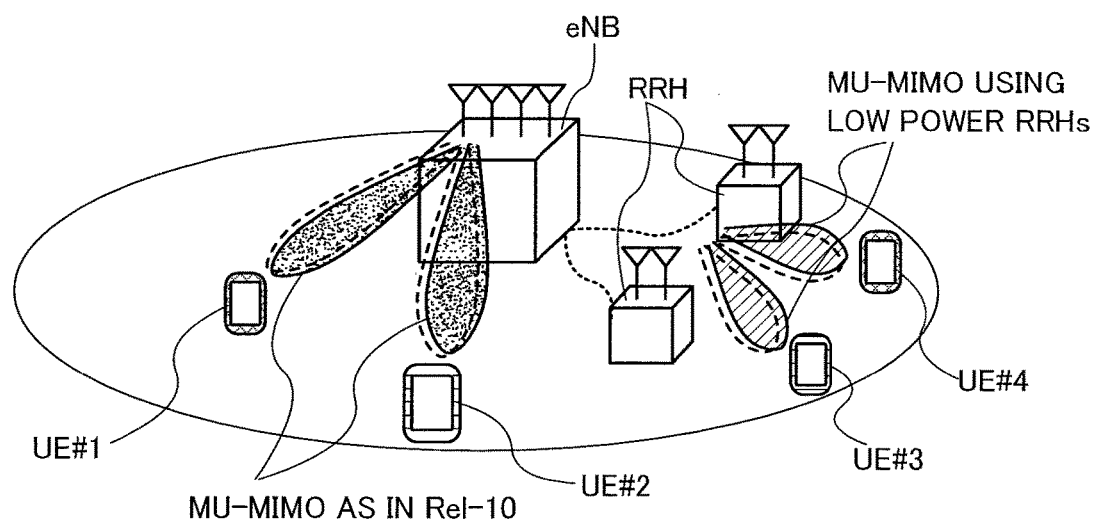
FIG. 1 is a schematic diagram of a radio communication system to which MU-MIMO is applied.

FIG. 1 is a diagram illustrating an example of a radio communication system to which MU-MIMO transmission is applied. In the system illustrated in FIG. 1, a small-sized base station (e.g., RRH Remote Radio Head) having a local coverage area is provided in a coverage area of a radio base station (e.g., eNB: eNodeB), and the system is configured hierarchically. In this system, downlink MU-MIMO transmission is performed such that data is transmitted from a plurality of antennas of a radio base station to a plurality of user terminals UE #1 and UE #2 (UE: User Equipment) simultaneously. In addition, data is transmitted from a plurality of antennas of a plurality of small-sized base stations to a plurality of user terminals UE #3 and UE #4 simultaneously.

Figure 2:
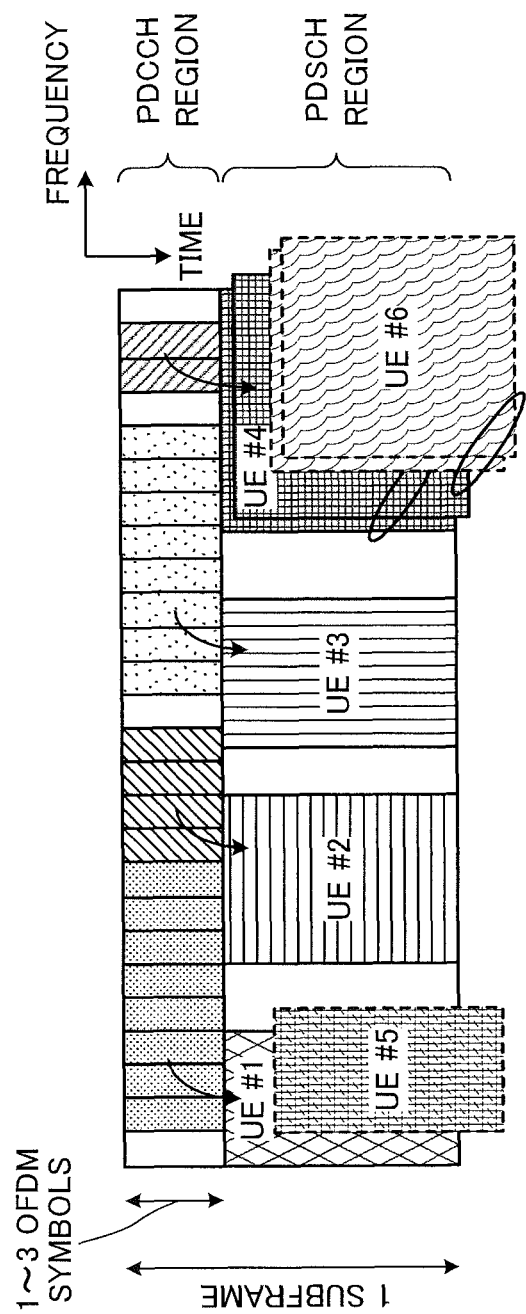
FIG. 2 is a diagram illustrating an example of a subframe for downlink MU-MIMO transmission.

FIG. 2 is a diagram illustrating an example of a radio frame (e.g., one subframe) to which downlink MU-MIMO transmission is applied. As illustrated in FIG. 2, in the system under application of MU-MIMO transmission, first to a predetermined-number OFDM symbols (3 OFDM symbols at the maximum) in each subframe are reserved as a radio resource region for downlink control channel (PDCCH: Physical Downlink Control Channel) (PDCCH region). Besides, radio resources following the first to predetermined-number symbols are reserved as a radio resource region for downlink shared data channel (PDSCH: Physical Downlink Shared Channel) (PDSCH region).

The PDCCH region is allocated with downlink control information (DCI) for user terminals UE (here, UE #1 to UE #4). DCI includes assignment information of data to the user terminals UE in the PDSCH region and the like. For example, in FIG. 2, the user terminal UE #2 receives data for the user terminal UE #2 allocated to the PDSCH region, based on DCI for the user terminal UE #2 allocated to the PDCCH region.

Further, in MU-MIMO transmission, data transmission for a plurality of user terminals is allowed at the same time and in the same frequency. Therefore, in the PDSCH region of FIG. 2, data for the user terminal UE #1 and the data for the user terminal UE #5 may be multiplexed to the same frequency region. Likewise, data for the user terminal UE #4 and data for the user terminal UE #6 may be multiplexed to the same frequency region.

However, as illustrated in FIG. 2, if data for the user terminals UE #1 to UR #6 is attempted to be allocated to the PDSCH region, it may be difficult to allocate DCI for all the user terminals UE #1 to UE #6 to the PDCCH region. For example, in the PDCCH region of FIG. 2, DCI for the user terminals UE #5 and UE #6 cannot be allocated. In this case, due to insufficiency of the PDCCH region to allocate with DCI, the number of user terminals UE to multiplex to the PDSCH region is restricted, and therefore, it may be difficult to enjoy the improvement in the efficiency of use of radio resources by MU-MIMO transmission.

In order to solve this problem of shortage of the PDCCH region, it may be configured that the PDCCH allocation region is extended to a region excluding the control region of the first to third OFDM symbols in the subframe (the PDCCH region is extended to the existing PDSCH region of fourth and later OFDM symbols). As a method to extend the PDCCH region, there are a method of time-division-multiplexing PDSCH and PDCCH (TDM approach) as illustrated in FIG. 3A and a method of frequency-division-multiplexing PDSCH and PDCCH (FDM approach) as illustrated in FIGS. 3B and 3C.

Figure 3A:
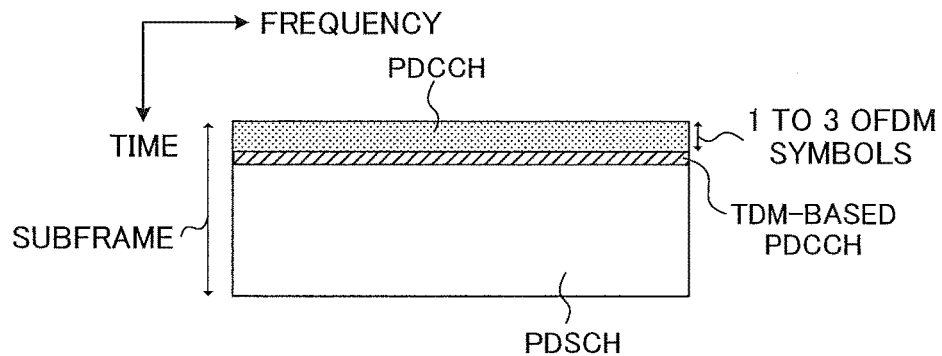
FIG. 3 provides diagrams each for explaining a subframe structure for enhanced PDCCH.
Figure 3B:
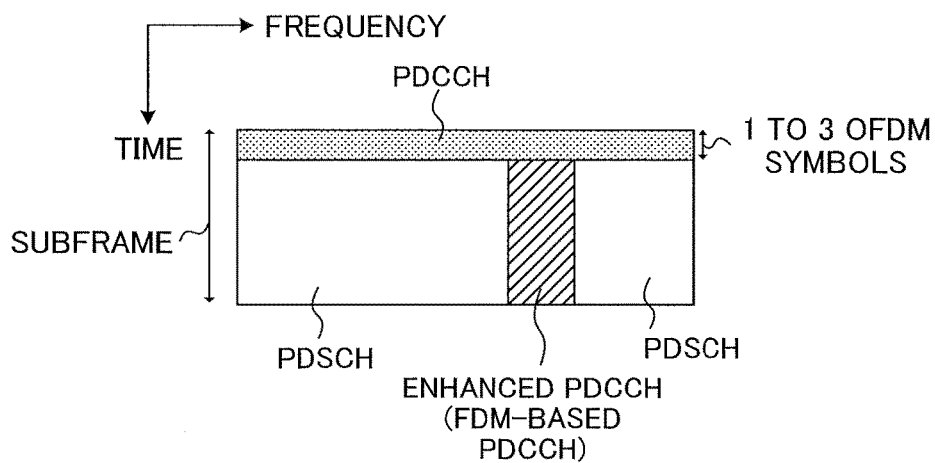
Figure 3C:
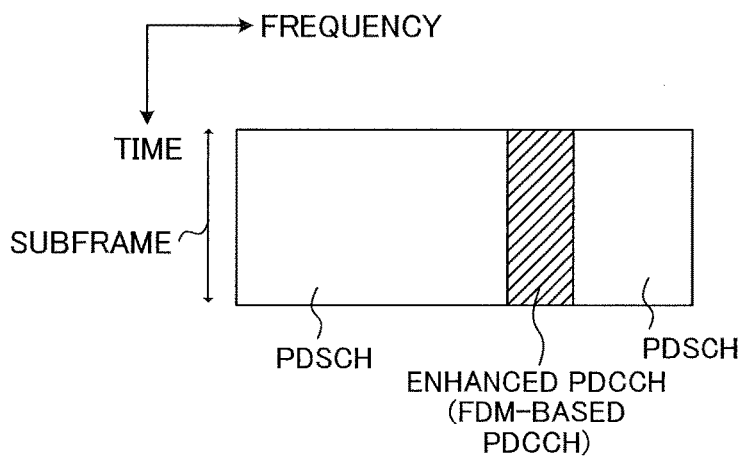

In the TDM approach as illustrated in FIG. 3A, the PDCCH is arranged over the system bandwidth in some OFDM symbols out of fourth and later OFDM symbols in the subframe. On the other hand, in the FDM approach as illustrated in FIG. 3B, the PDCCH is arranged in a part of the system bandwidth over all the fourth and later OFDM symbols in the subframe. In the FDM approach as illustrated in FIG. 3C, the PDCCH is arranged in a part of the system bandwidth over all the OFDM symbols in the subframe. The resource allocation illustrated in FIG. 3C may be called "new carrier type" or the like.

The PDCCH frequency-division-multiplexed with the PDSCH in the FDM approach can be demodulated using a demodulation reference signal which is a user-specific reference signal (DM-RS: DeModulation-Reference Signal). Therefore, DCI transmitted by this PDCCH is able to enjoy a beamforming gain like downlink data transmitted in the PDSCH and is also effective at increasing the capacity of the PDCCH.

In the following description, a PDCCH frequency-division-multiplexed with a PDSCH in the FDM approach is called enhanced PDCCH. This enhanced PDCCH may be also called enhanced physical downlink control channel, ePDCCH, E-PDCCH, FDM-based PDCCH, UE-PDCCH or the like.

Figure 4A:
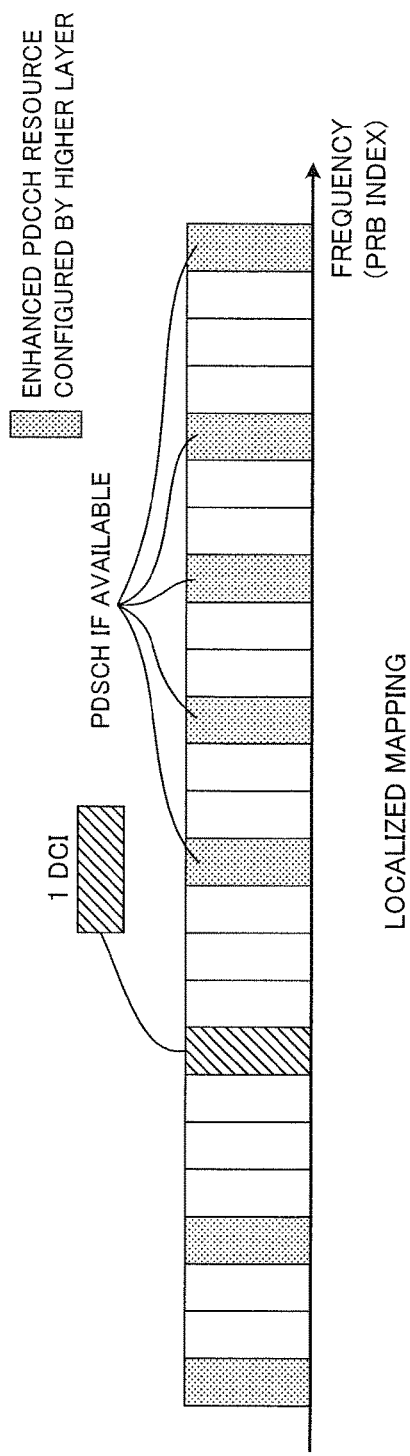
FIG. 4 provides diagrams each for explaining a mapping method of the enhanced PDCCH.

As the DCI mapping method in the enhanced PDCCH, localized mapping and distributed mapping have been considered. FIG. 4 provides diagrams each illustrating an example of DCI mapping method in the enhanced PDCCH. FIG. 4A illustrates an example of localized mapping and FIG. 4B illustrates an example of distributed mapping.

As illustrated in 4A and 4B, the enhanced PDCCH is made up of a predetermined number of physical resource block (PRE) pairs that are distributed over the system bandwidth. Each PRB pair is made up of two consecutive PRBs in the time direction and is identified by a PRB index assigned in the frequency direction. The plural PRB pairs that make up the enhanced PDCCH may be dynamically determined by higher layers or may be fixed in the specifications.

As illustrated in FIG. 4A, in the localized mapping, one DCI is locally mapped to a specific PRB pair of the enhanced PDCCH. Specifically, one DCI is mapped to a predetermined number of PRB pairs (for example, one or two PRB pairs of better channel quality) based on CQI fed back from the user terminal UE. In the localized mapping, use of CQI makes it possible to achieve a frequency scheduling gain. Note that in FIG. 4A, among a plurality of PRB pairs that make up the enhanced PDCCH, a PRB pair with no DCI mapping may be mapped with PDSCH.

Figure 4B:
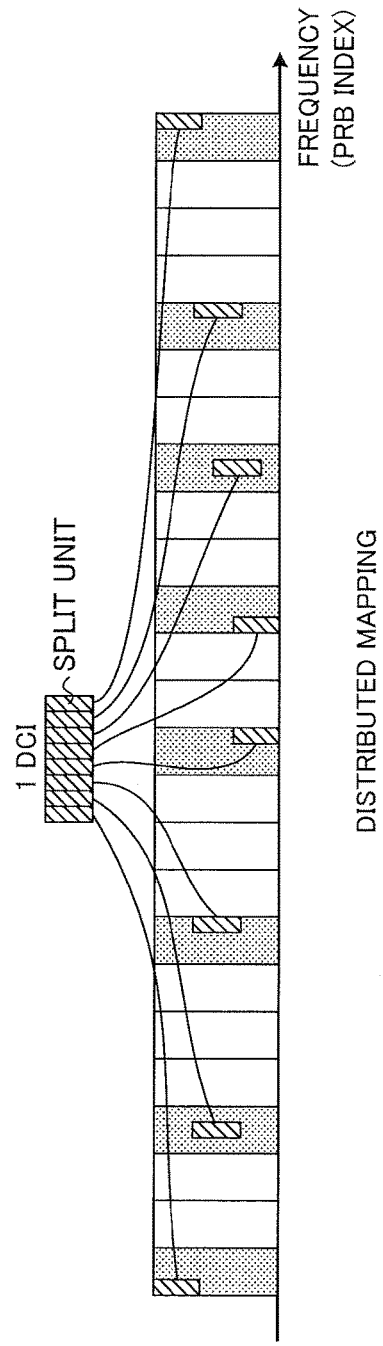

As illustrated in FIG. 4B, in the distributed mapping, one DCI is mapped in a distributed manner to a plurality of PRB pairs that make up the enhanced PDCCH. Specifically, one DCI is divided into a plurality of split units, which are mapped in a distributed manner to the above-mentioned PRB pairs (may be mapped to all the PRB pairs). In the distributed mapping, as one DCI is distributed over the system band, it is possible to achieve a frequency diversity gain.

Figure 5A:
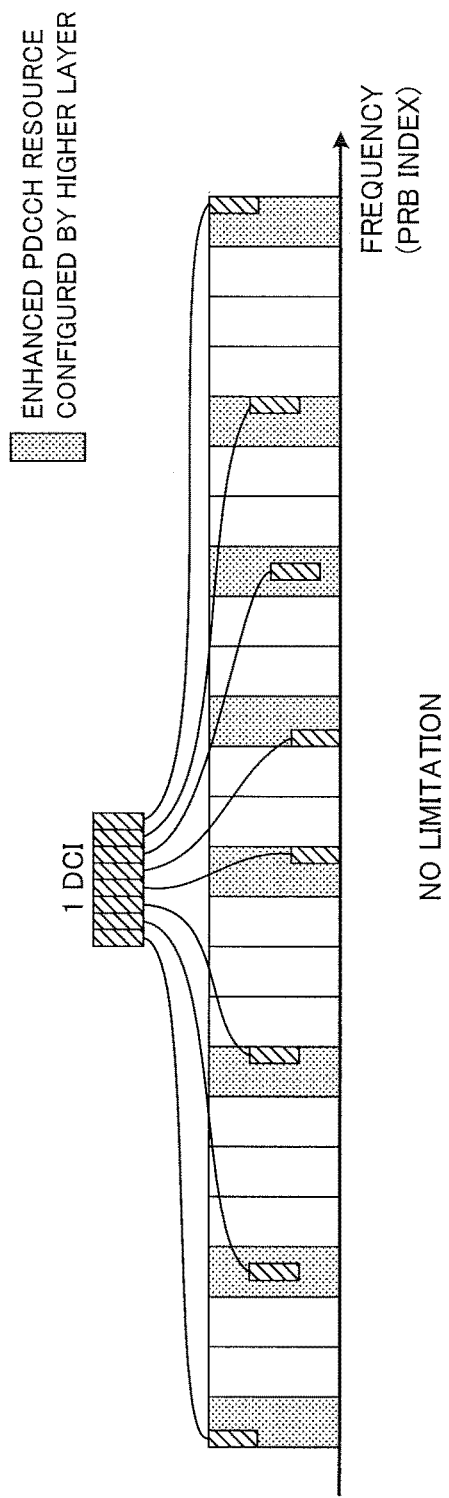
FIG. 5 provides diagrams each illustrating an example of distributed mapping of the enhanced PDCCH.

As described above, in the distributed mapping, each DCI is divided into a plurality of split units, which are mapped in a distributed manner to a plurality of PRB pairs that made up the enhanced PDCCH. Therefore, as illustrated in FIG. 5A, when the enhanced PDCCH is made up of a plurality of PRB pairs (eight PRB pairs in FIG. 5A), if one DCI is only mapped, the utilization efficiency of radio resources is reduced. This is because split units of one DCI are mapped in a distributed manner to many PRB pairs, thereby reducing PRB pairs available for PDSCH mapping.

Figure 5B:
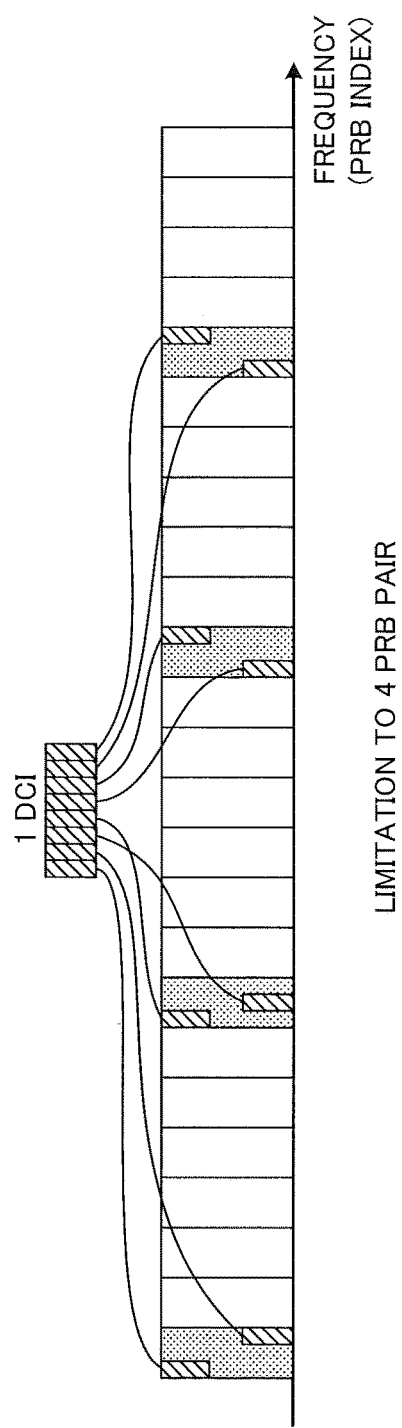

Then, in the distributed mapping, as illustrated in FIG. 5B, it has been considered that a limitation is imposed to restrict the number of PRB pairs to which split units of one DCI are mapped in a distributed manner. In FIG. 5B, the number of PRB pairs to which split units of one DCI are mapped in a distributed manner is limited to four. Therefore, in FIG. 5B, the number of PRB pairs available for PDSCH mapping is increased as compared with the case in FIG. 5A.

Figure 6:
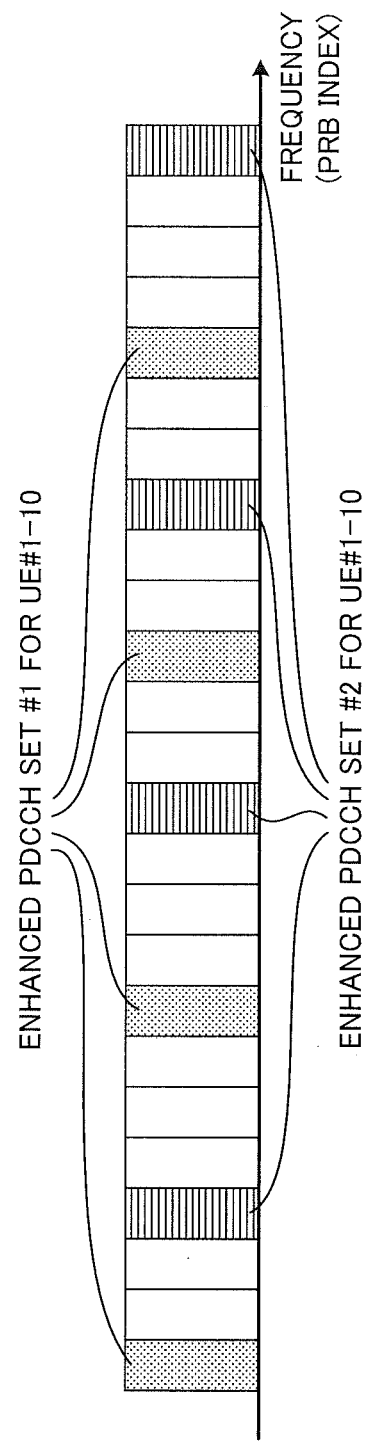
FIG. 6 is a diagram illustrating an example of enhanced PDCCH sets.

It has been also considered that when transmitting DCI using enhanced PDCCH, a plurality of enhanced PDCCH sets are configured for each user terminal UE. As illustrated in FIG. 6, each of enhanced PDCCH sets #1 and #2 is made up of a plurality of PRB pairs to be allocated to the enhanced PDCCH.

Here, the enhanced PDCCH set may be called ePDCCH set, E-PDCCH set or simply set. The number of enhanced PDCCH sets (K) configured for each user terminal UE meets, for example, 1≤K≤2 but is not limited to this condition. The number of PRB pairs (n) that make up each enhanced PDCCH set is, for example, 2, 4, 8 or 16, but is not limited to these numbers.

In FIG. 6, the enhanced PDCCH sets #1 and #2 may be configured for a plurality of user terminals (for example, user terminals UE #1 to UE #10) on a shared basis. With this configuration, when the number of user terminals UE for which to transmit DCI is smaller than a predetermined number (e.g., 5), DCI may be mapped only to the one enhanced PDCCH set #1 and the other enhanced PDCCH set #2 may be used for PDSCH. As the plural enhanced PDCCH sets are thus configured for user terminals on a shared basis, it is possible to improve the efficiency of use of radio resources.

In each enhanced PDCCH set, DCI may be mapped by distributed mapping (see FIGS. 4B and 5) or by localized mapping (see FIG. 4A). Besides, a primary set and a secondary set may be configured to each user terminal. The primary set is an enhanced PDCCH set configured for all user terminals UE on a shared basis, and the primary set is used, for example, as a common search space (CSS). The secondary set is an enhanced PDCCH set configured for at least one user terminal UE individually, and the secondary set is used, for example, as a user-specific search space (UE-specific SS).

As described above, when the enhanced PDCCH set is configured for a user terminal UE, it is necessary to notify the user terminal UE of a resource configuration of the enhanced PDCCH set. To meet this need, consideration is given to various notification methods including a notification method using a bitmap (FIG. 7) and a notification method using PRB indexes (FIG. 8).

Figure 7:
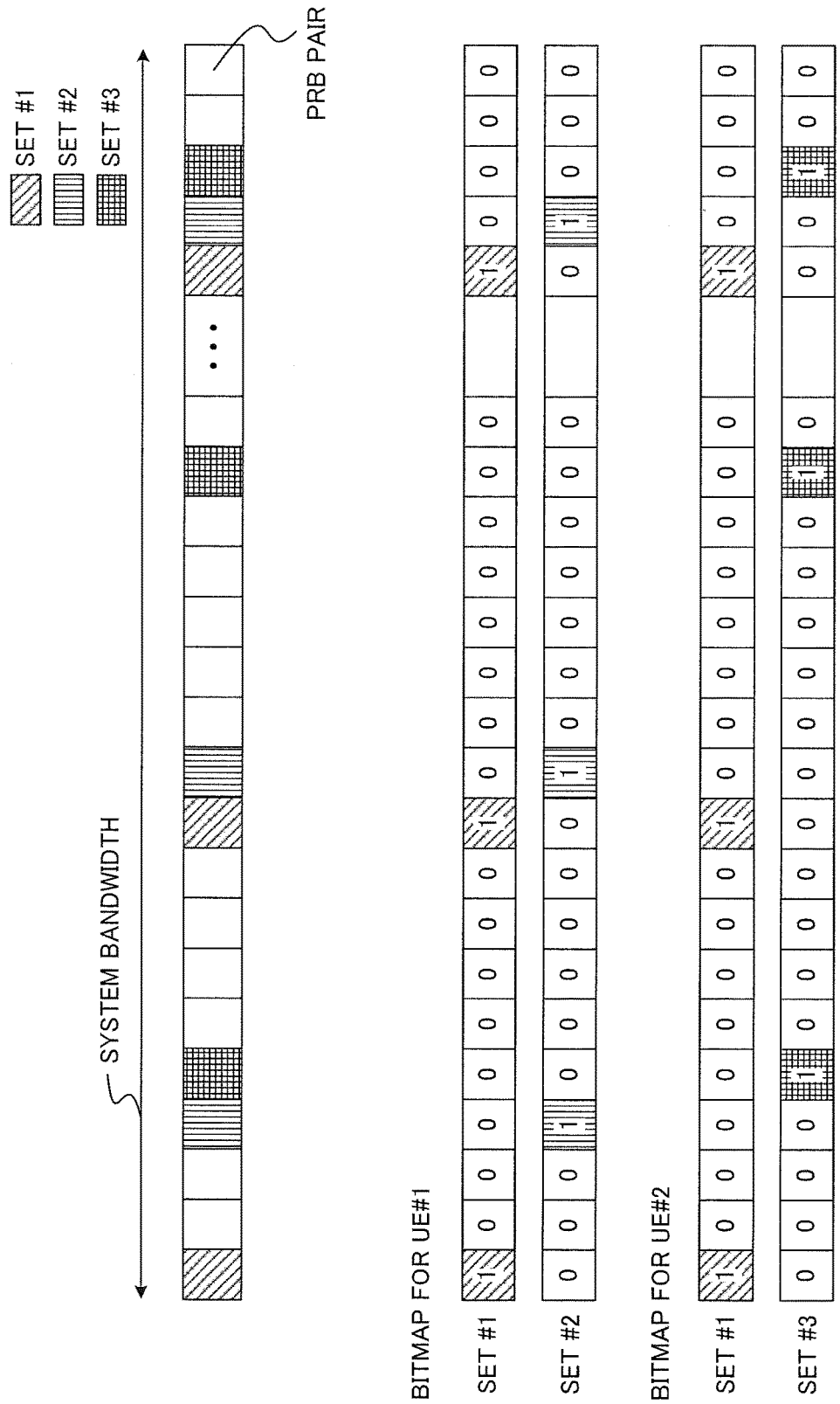
FIG. 7 is a diagram illustrating an example of notification using bitmaps.
Figure 8:
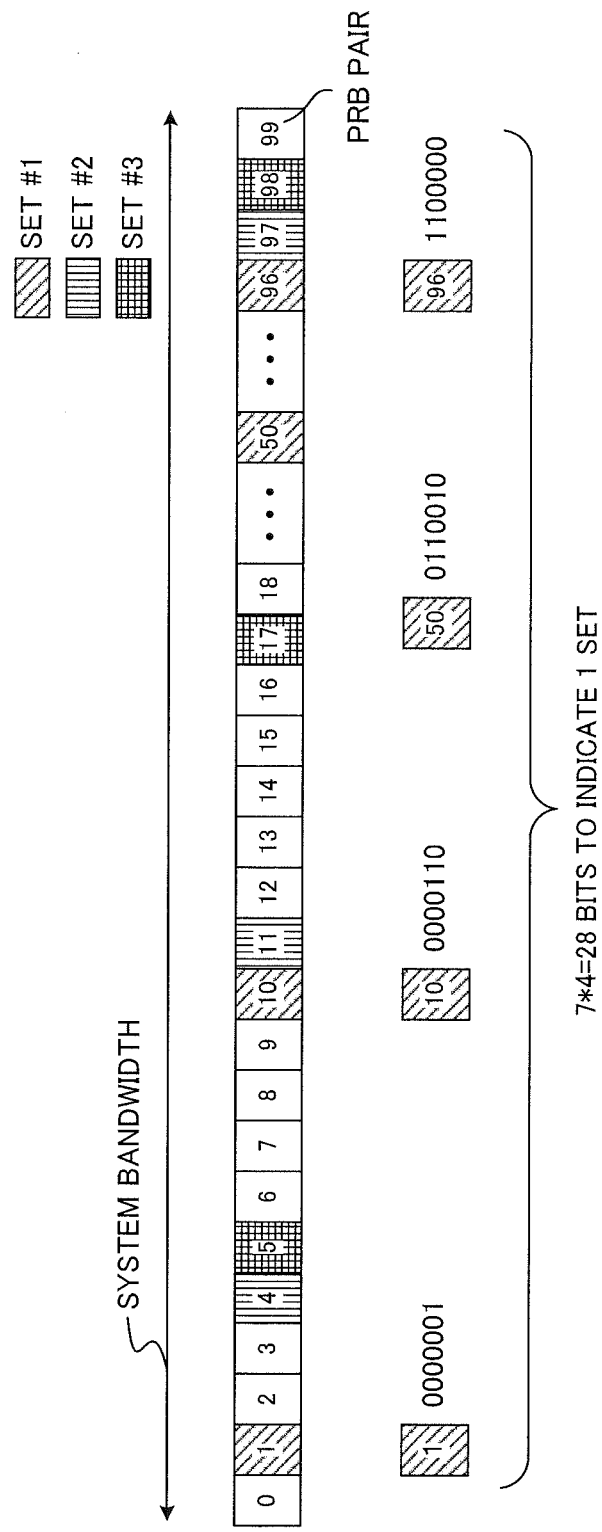
FIG. 8 is a diagram illustrating an example of notification using PRB indexes.

FIG. 7 is a diagram illustrating an example of the notification method using bitmaps. In the notification method as illustrated in FIG. 7, the user terminal UE is notified of bitmaps each indicating PRB pairs that make up the enhanced PDCCH set (set) by higher layer signaling such as RRC signaling. The bitmap for each enhanced PDCCH set is made up of bits that are equal in number to PRB pairs that constitute the system bandwidth. Each bit corresponds to a PRB pair and a set value of each bit ("0" or "1") is used to indicate whether the corresponding PRB pair is included in the enhanced PDCCH set or not.

For example, in FIG. 7, the user terminal UE #1 for which the enhanced PDCCH sets #1 and #2 are configured is notified of bitmaps indicating the PRB pairs that make up the enhanced PDCCH sets #1 and #2. The user terminal UE #2 for which the enhanced PDCCH sets #1 and #3 are configured is notified of bitmaps indicating the PRB pairs that make up the enhanced PDCCH sets #1 and #3.

In the notification method using a bitmap, there is a need to notify the user terminal of an equal number of bits to the number of PRB pairs that make up the system bandwidth for each enhanced PDCCH set. For example, the number of PRB pairs that make up the system bandwidth is "100", there is a need to notify the user terminal of 100 bits for each enhanced PDCCH set.

FIG. 8 is a diagram illustrating an example of the notification method using PRB indexes. In the notification method as illustrated in FIG. 8, the user terminal UE is notified of the PRB indexes of PRB pairs that make up the enhanced PDCCH set (set) by higher layer signaling such as RRC signaling.

As illustrated in FIG. 8, when the system bandwidth is made up of 100 PRB pairs, the 100 PRB pairs are identified uniquely by 7-bit PRB indexes. Here, assuming that the enhanced PDCCH set #1 is made up of PRB pairs #1, #10, #50 and #96, the user terminal UE is notified of the PRB indexes "0000001", "0000110", "0110010" and "1100000" to identify the PRB pairs #1, #10, #50 and #96, respectively.

In the notification method using PRB indexes, there is a need to notify, for each enhanced PDCCH set, the user terminal UE of bits which number is equal to a multiplication value (product) obtained by multiplying the number of bits of a PRB index by the number of PRB pairs per enhanced PDCCH set. For example, when the system bandwidth is made up of 100 PRB pairs, the number of bits of the PRB index "7" is multiplied by the number of PRB pairs n "4" for each enhanced PDCCH set, and a resultant multiplication value "28" bits are required to be signaled per enhanced PDCCH set.

In the notification method mentioned above, the user terminal UE is notified of information indicating the plural PRB pairs, as they are, that make up the enhanced PDCCH set (for example, the bitmaps in FIG. 7 and PRB indexes in FIG. 8). Accordingly, in association with notification of the configuration of the enhanced PDCCH set, there may occur an increase in overhead undesirably.

Then, the present inventors have reached an idea that the overhead associated with notification of the resource configuration of the enhanced PDCCH set is reduced by notifying the user terminal of pattern information indicating a combination of the plural PRB pairs, instead of information indicating the plural PRB pairs of the enhanced PDCCH set as they are, and have finally completed the present invention.

In the radio communication method according to the present invention, the radio base station configures, for the user terminal UE, an enhanced PDCCH set (resource set). The radio base station notifies the user terminal UE of the pattern information of the plural resource blocks that make up the enhanced PDCCH set and information indicating the number (n) of resource blocks that make up the enhanced PDCCH set. The user terminal UE specifies the plural resource blocks that make up the enhanced PDCCH set, based on the pattern information and the number (n) of resource blocks.

Here, the pattern information is information indicating a combination of the plural resource blocks that make up the enhanced PDCCH set. For example, the pattern information may be a pattern index indicating a resource block pattern as a combination of the plural resource blocks (see the first and second embodiments described later). Or, the pattern information may include a pattern index indicative of an RBG pattern that is a combination of plural resource block group (RBGs) including the corresponding resource blocks and the position information of the plural resource blocks in the plural RBGs (see the third and fourth embodiments described later).

In addition, the resource block is a frequency resource unit for configuring an enhanced PDCCH set, and may be a PRB pair and a PRB. In the following description, the resource block is described as a PRB pair, but is not limited to this. The resource block group (RBG) is made of a predetermined number of resource blocks that are consecutive in the frequency domain. In the following description, the resource block group is described as being made of a predetermined number of PRB pairs that are consecutive in the frequency domain, however, it may be made of a predetermined number of PRBs that are consecutive in the frequency domain.

First Embodiment

With reference to FIGS. 9 to 13, a radio communication method according to the first embodiment of the present invention will be described below. In the radio communication method according to the first embodiment, the radio base station notifies the user terminal UE of a PRB pattern index (pattern index) indicating a PRB pattern (resource block pattern) and information indicating the number (n) of PRB pairs that make up the enhanced PDCCH set. The PRB pattern is a combination of n PRB pairs that make up the enhanced PDCCH set.

Figure 9:
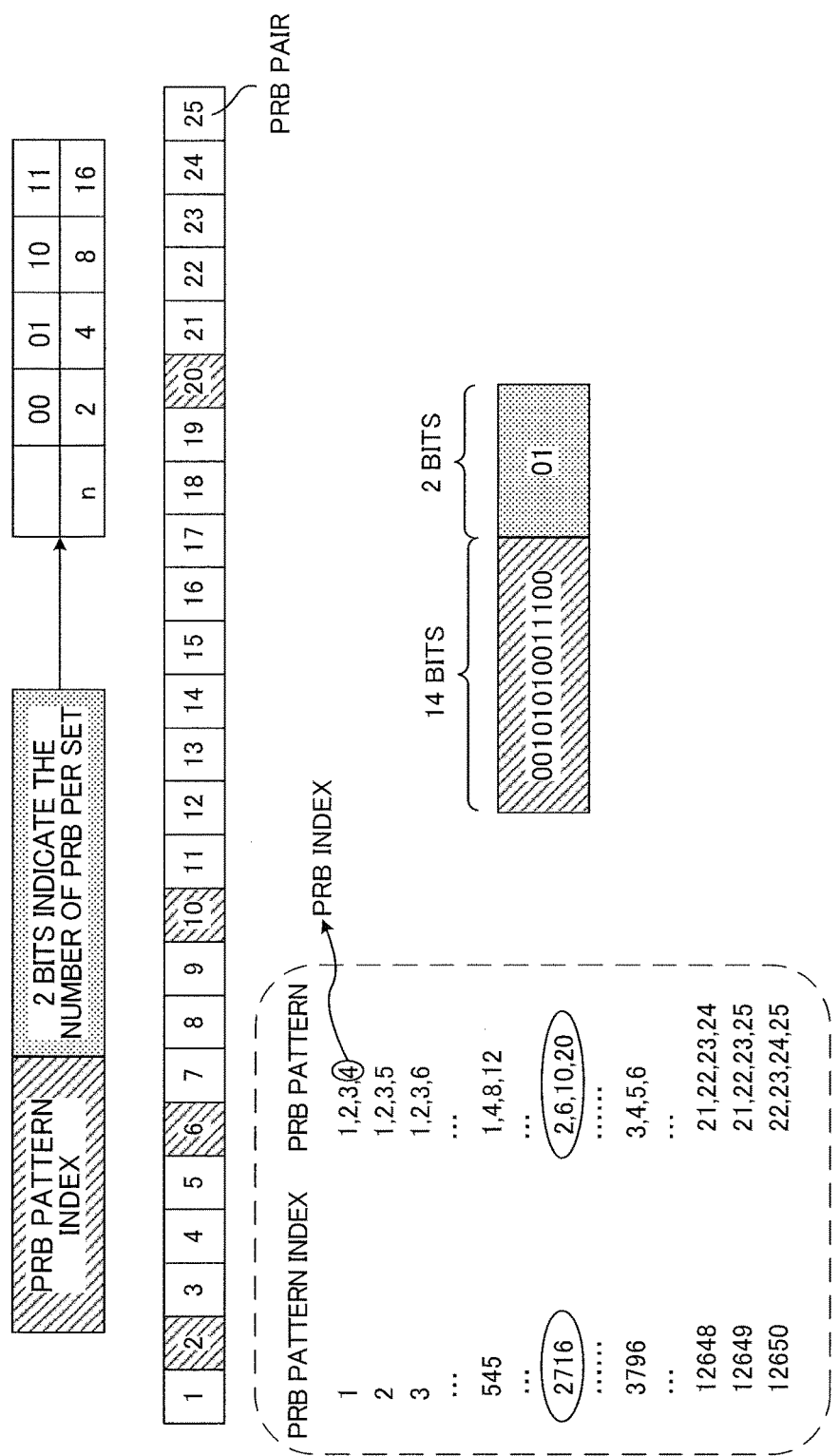
FIG. 9 is a diagram for explaining a radio communication method according to a first embodiment.

FIG. 9 is a diagram for explaining the radio communication method according to the first embodiment. In FIG. 9, the total number N of PRB pairs that constitute the system bandwidth is "25" and the 25 PRB pairs are assigned with PRB indexes (e.g., 1 to 25), respectively. The total number of PRB pairs that constitute the system bandwidth is not limited to "25". The PRB indexes illustrated in FIG. 9 are given for illustrative purpose only and, for example, the 25 PRB pairs may be assigned with PRB indexes 0 to 24.

Further, FIG. 9 shows the number n of PRB pairs that make up the enhanced PDCCH set (set) includes four kinds of "2", "4", "8" and "16". The four PRB pair numbers n are expressed as 2-bit information (e.g., "00", "01", "10", "11"). The number n f PRB pairs that make up the enhanced PDCCH set is not limited to "2", "4", "8", and "16". The information indicating the number of PRB pairs is not limited to 2 bits, but may be increased or decreased in bits in accordance with the number of kinds of the number n of PRB pairs.

As illustrated in FIG. 9, the total number N of PRB pairs that make up the system bandwidth is "25" and the number of PRB pairs n that make up the enhanced PDCCH set is "4", the number of kinds of the PRB pattern becomes equal to the number of combinations of four PRB pairs selected from 25 PRB pairs with no overlap ($=_{25}C_4=12650$). 12650-kind PRB patterns are assigned with PRB pattern indexes (for example, 1 to 12650) to identify the respective PRB patterns. These 12650-kind PRB patterns are identified uniquely by 14-bit PRB pattern indexes.

As illustrated in FIG. 9, in the case where a certain enhanced PDCCH set is made up of four PRB pairs #2, #6, #10 and #20, the PRB pattern of the enhanced PDCCH set is identified by the PRB pattern index "2716". In this case, the radio base station notifies the user terminal UE of the PRB pattern index "00101010011100" ("2716" in decimal number) and information "01" indicative of the number n "4" of PRB pairs that make up the enhanced PDCCH set. This notification is performed by higher layer signaling such as RRC signaling.

Figure 10:
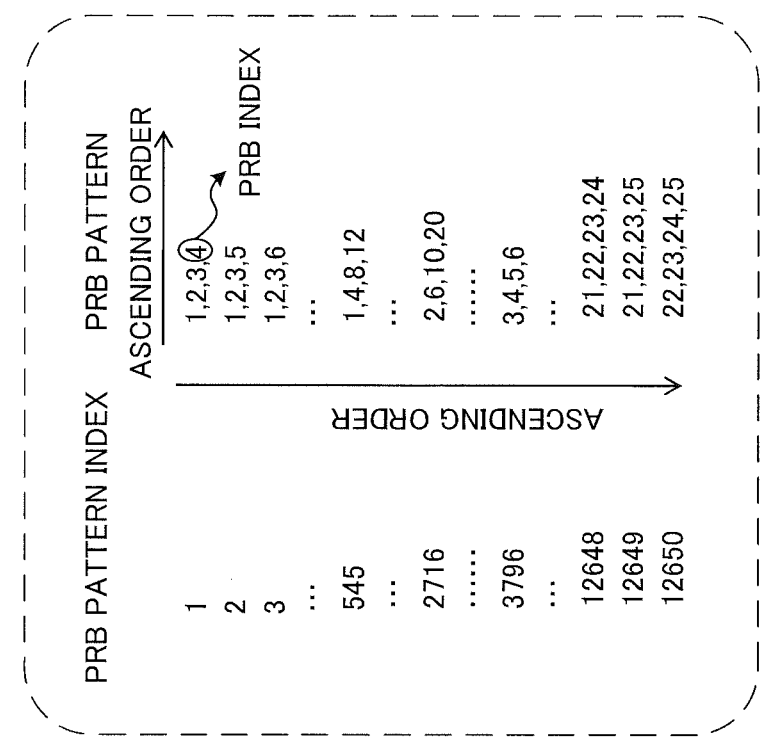
FIG. 10 is a diagram illustrating an example of PRB patterns and PRB pattern indexes according to the first embodiment.

With reference to FIG. 10, description is made in detail about the PRB pattern and PRB pattern index. FIG. 10 is a diagram illustrating an example of PRB pattern and the PRB pattern index. In FIG. 10, it is assumed as an example that the total number N of PRB pairs that make up the system bandwidth is "25", and the number n of PRB pairs that make up the enhanced PDCCH set is "4".

In the case shown in FIG. 10, there are $_NC_n$ ($=_{25}C_4=12650$) kinds of PRB pattern. As indicated by the horizontal axis in FIG. 10, the n (=4) PRB pairs in each PRB pattern are arranged in ascending order of PRB index. Also, as indicated by the vertical axis in FIG. 10, all kinds (=12650) of PRB pattern are arranged in ascending order of PRB index A1 of the first PRB pair among PRB patterns. When the PRB indexes A1 are the same, they are arranged in ascending order of PRB index A2 of the second PRB pair, and when the PRB indexes A1 and A2 are the same, they are arranged in ascending order of PRB index A3 of the third PRB pair, and so on. Arrangement is made about all kinds of PRB pattern.

As described above, when all kinds of PRB pattern are arranged, the radio base station calculates a PRB pattern index in accordance with the equation (1).

$$\sum_{i=1}^{A_1-1} C_{N-i}^{n-1} + \sum_{j=A_1+1}^{A_2-1} C_{N-j}^{n-2} + \hspace{2em} \text{Equation (1)}$$

$$\sum_{x=A_2+1}^{A_3-1} C_{N-x}^{n-3} + \ldots + \sum_{y=A_{n-1}+1}^{A_n-1} C_{N-y}^{0} + 1$$

Here, N is the total number of PRB pairs that make up the system bandwidth. And, n is the number of PRB pairs that make up the enhanced PDCCH set. Ai (1≤i≤n) is a PRB index of the i-th PRB pair in the PRB pattern.

With reference to FIG. 11, a calculation method of a PRB pattern index in the radio base station is described below. The calculation method of a PRB pattern index described in FIG. 11 is an example of calculation using the equation (1) in which the total number N of PRB pairs that make up the system bandwidth is "25", the number n of PRB pairs per enhanced PDCCH set is "4", and the PRB pattern for the enhanced PDCCH set is made up of PRB pairs #2, #6, #10 and #20.

In FIG. 11, $_{25}C_4$ (=12650) kinds of PRB pattern are arranged as illustrated in FIG. 10. When the enhanced PDCCH set is made up of PRB pairs #2, #6, #10 and #20, the PRB indexes A1, A2, A3 and A4 of the first to fourth PRB pairs are "2", "6", "10" and "20", respectively.

The first term in the equation (1) in FIG. 11A is used to calculate the sum of PRB patterns until the PRB index of the first PRB pair becomes A1 (=2). As illustrated in FIG. 11B, the sum of the PRB patterns is "2024".

Besides, the second term of the equation (1) in FIG. 11A is used to calculate the sum of PRB patterns from when the PRB index of the first PRB pair becomes A1 (=2) to when the PRB index of the second PRB pair becomes A2 (=6). As illustrated in FIG. 11B, the sum of the PRB patterns is "631".

Further, the third term of the equation (1) in FIG. 11A is used to calculate the sum of PRB patterns from when the PRB index of the second PRB pair becomes A2 (=6) to when the PRB index of the third PRB pair becomes A3 (=10). As illustrated in FIG. 11B, the sum of PRB patterns is "51".

Further, the fourth term of the equation (1) in FIG. 11A is used to calculate the sum of PRB patterns from when the PRB index of the third PRB pair becomes A3 (=10) to when the PRB index of the fourth PRB pair becomes A4 (=20). As illustrated in FIG. 11B, the sum of the PRB patterns is "9".

As described above, the equation (1) is used to be able to calculate the sum of PRB patterns (2024+631+51+9) until a combination of n PRB pairs that make up the enhanced PDCCH set (here, PRB pairs #2, #6, #10, #20) is obtained. In the equation (1), the PRB pattern index (=2716) for identifying the PRB pattern for the above-mentioned enhanced PDCCH set is obtained by adding 1 to the sum.

The radio base station notifies the user terminal UE of the PRB pattern index calculated out by using the equation (1) and information indicative of the number n of PRB pairs that make up the enhanced PDCCH set. The user terminal UE specifies a plurality of PRB pairs that make up the enhanced PDCCH set based on the PRB pattern index and the number n of PRB pairs given from the radio base station.

Specifically, the user terminal UE finds a PRB index A1 that meets the equation (2-1) to specify the first PRB pair of the enhanced PDCCH set. Likewise, the user terminal UE finds the PRB indexes A2, A3, . . . that meet the equations (2-2), (2-3), . . . , respectively, thereby to specify the second, third, . . . , PRB pairs that make up the enhanced PDCCH set.

$$\sum_{i=1}^{A_1-1} C_{N-i}^{n-1} \leq \text{index} \leq \sum_{i=1}^{A_1} C_{N-i}^{n-1} \qquad \text{Equation (2-1)}$$

$$\sum_{j=A_1+1}^{A_2-1} C_{N-j}^{n-2} \leq \text{index} - \sum_{i=1}^{A_1-1} C_{N-i}^{n-1} \leq \sum_{j=A_1+1}^{A_2} C_{N-j}^{n-2} \qquad \text{Equation (2-2)}$$

$$\sum_{x=A_2+1}^{A_3-1} C_{N-x}^{n-3} \leq$$

$$\text{index} - \sum_{i=1}^{A_1-1} C_{N-i}^{n-1} - \sum_{j=A_1+1}^{A_2-1} C_{N-j}^{n-2} \leq \sum_{x=A_2+1}^{A_3} C_{N-x}^{n-3} \qquad \text{Equation (2-3)}$$

Here, the index is a PRB pattern index of which the radio base station notifies the user terminal UE. N is the total number of PRB pairs that make up the system bandwidth. And, n is the number of PRB pairs that make up the enhanced PDCCH set. Ai (1≤i≤n) is the PRB index of the i-th PRB pair in the PRB pattern. Here, i, j and x are predetermined subscripts.

With reference to FIG. 12, description is made about a method for specifying a plurality of PRB pairs that make up the enhanced PDCCH set in the user terminal UE. In FIG. 12, the radio base station notifies the user terminal UE of the PRB pattern index (index) "2716" and the number n "4" of PRB pairs that make up the enhanced PDCCH set. The total number N of PRB pairs that make up the system bandwidth is "25". The total number N of PRB pairs that make up the system bandwidth may be given from the radio base station to the user terminal UE or may be fixed in the specifications.

As illustrated in FIG. 12, the user terminal UE substitutes the PRB pattern index "2716" given from the radio base station, the number n of PRB pairs "4" per enhanced PDCCH set and the total number N "25" of PRB pairs that make up the system bandwidth into the equation (2-1) to specify the PRB index A1 that meets the equation (2-1). In FIG. 12, the equation (2-1) is satisfied when the PRB index A1 is "2", and therefore, the first PRB pair #2 of the enhanced PDCCH set is specified.

Likewise, the user terminal UE specifies the PRB indexes A2, A3 and A4 that meet the equations (2-2), (2-3) and (2-4), respectively. In FIG. 12, when the PRB indexes A2, A3 and A4 are "6", "10" and "20", the equations (2-2), (2-3) and (2-3) are satisfied. Therefore, the second, third and fourth PRB pairs #6, #10 and #20 of the enhanced PDCCH set are specified, respectively.

As described above, the user terminal UE finds the PRB indexes A1, A2, A3 and A4 that meet the equations (2-1), (2-2), (2-3) and (2-4) based on the PRB pattern index "2716" and the number n "4" of PRB pairs that make up the enhanced PDCCH set given from the radio base station thereby to reproduce the PRB pattern. Through this process, the PRB pairs #2, #6, #10 and #20 that make up the enhanced PDCCH set are specified.

According to the radio communication method of the first embodiment, the radio base station has only to notify the user terminal UE of the PRB pattern index and information indicative of the number n of PRB pairs that make up the enhanced PDCCH set thereby to allow the user terminal UE to specify the PRB pairs that make up the enhanced PDCCH set. Accordingly, as compared with the case of notifying information that indicates the plurality of PRB pairs of the enhanced PDCCH set as-is (e.g., bitmap in FIG. 7 and PRB indexes in FIG. 8), it is possible to reduce overhead associated with notification of the resource configuration of the enhanced PDCCH set.

Figure 13:
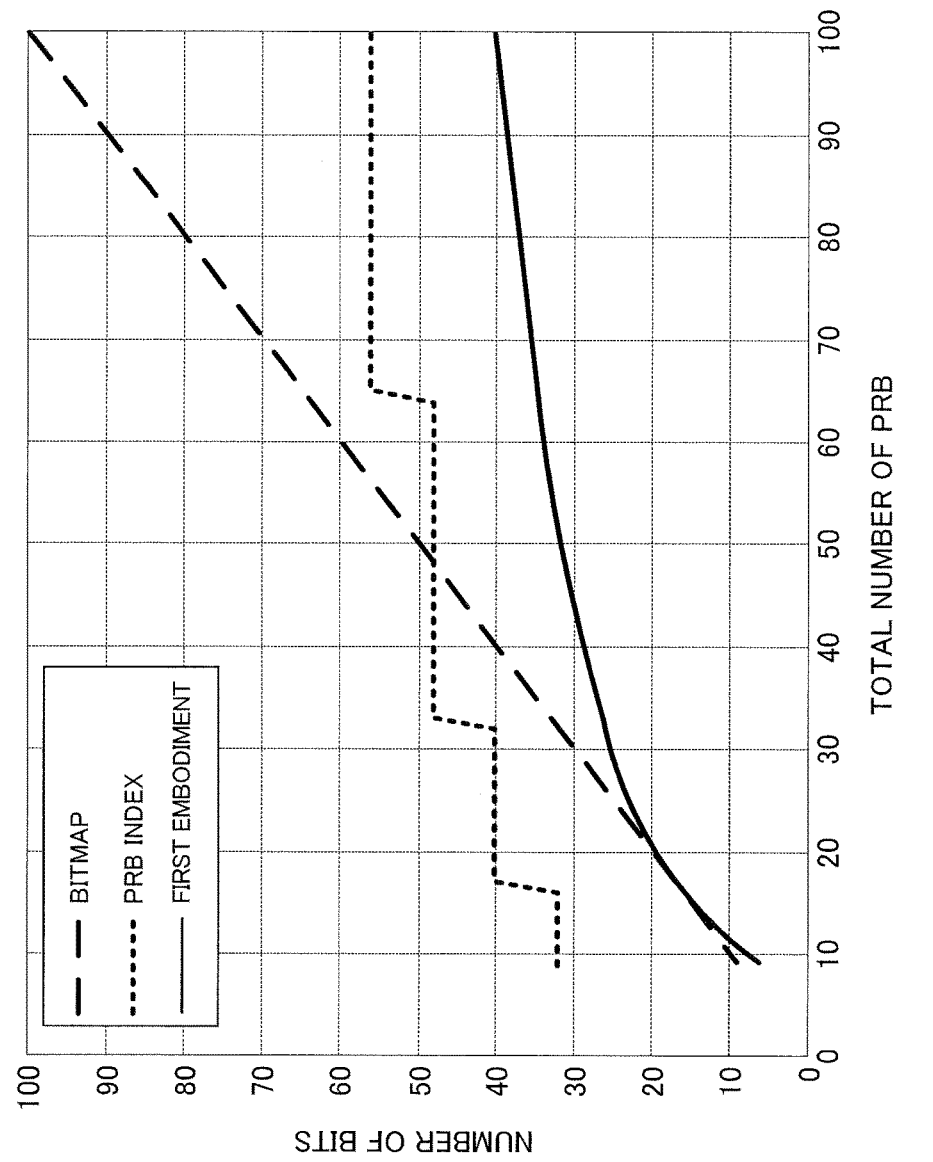
FIG. 13 is a diagram illustrating an effect of reduction in overhead by the radio communication method according to the first embodiment.

With reference to FIG. 13, description is made about the effect of reduction in overhead by the radio communication method according to the first embodiment. As illustrated in FIG. 13, in the notification method using a bitmap (see FIG. 7), the overhead is increased in proportion to the total number N of PRB pairs that make up the system bandwidth. In addition, in the notification method using PRB indexes (see FIG. 8), the overhead is increased in accordance with an increase in the number of bits of the PRB index. On the other hand, in the radio communication method according to the first embodiment, the above-mentioned overhead can be totally reduced as compared with the notification methods using the bitmap and PRB indexes.

In the radio communication method according to the first embodiment, the calculation described with reference to FIGS. 10 to 12 is required, which increases complexity as compared with the notification methods using a bitmap and PRB indexes. Therefore, in the radio communication method according to the first embodiment, reduction in overhead associated with notification of the resource configuration of the enhanced PDCCH set is achieved by accepting increased complexity due to the calculation to some degree.

Second Embodiment

Figure 14:
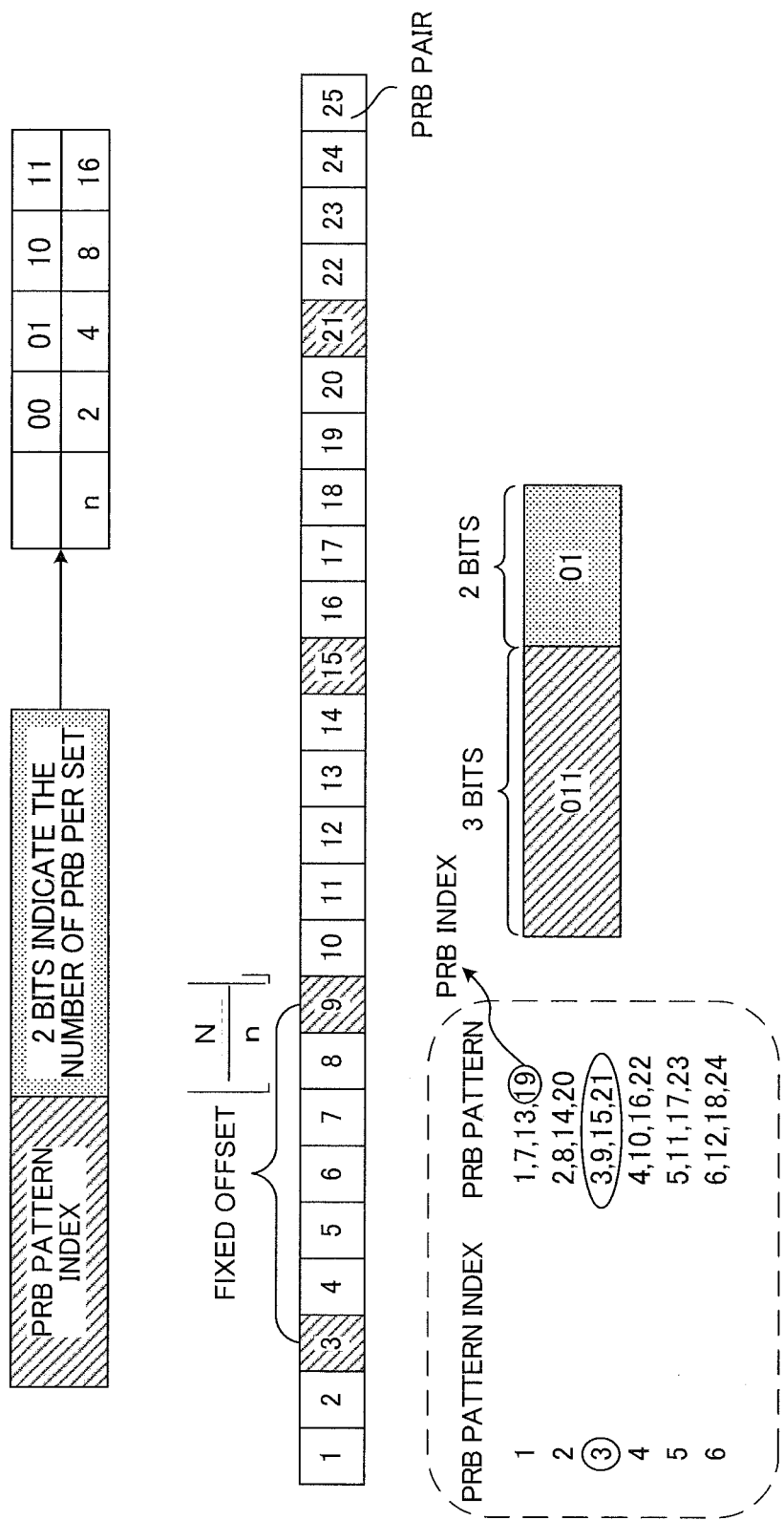
FIG. 14 is a diagram for explaining a radio communication method according to a second embodiment.

With reference to FIG. 14, description is made about a radio communication method according to the second embodiment of the present invention. The radio communication method according to the second embodiment is the same as that of the first embodiment in notifying the user terminal UE of a PRB pattern index and information indicative of the number (n) of PRB pairs that make up the enhanced PDCCH set. However, the radio communication method according to the second embodiment is different from that of the first embodiment in that the PRB pattern is restricted to a combination of n PRB pairs that are arranged with equal spacing.

FIG. 14 is an explanatory diagram of the radio communication method according to the second embodiment. As illustrated in FIG. 14, when the total number N of PRB pairs that make up the system bandwidth is "25", the number n of PRB pairs that make up the enhanced PDCCH set is "4", and a combination of 4 PRB pairs is selected from 25 PRB pairs with no overlap, there are found $_NC_n$ ($=_{25}C_4=12650$) kinds of combination. If the PRB pattern is restricted to combinations of n (=4) PRB pairs that are arranged with equal spacing, the number of kinds of PRB pattern is reduced thereby to be able to reduce the number of bits for the PRB pattern index.

For example, in FIG. 14, the PRB pattern is restricted to combinations of n (=4) PRB pairs that are arranged with predetermined spacing. The predetermined spacing is determined, for example, based on N/n (=25/4). As described above, N is the total number of PRB pairs that make up the system bandwidth and n is the number of PRB pairs that make up the enhanced PDCCH set. In this case, there are 6 kinds of PRB pattern as illustrated in FIG. 14 and they are identified uniquely by 3-bit PRB pattern indexes.

Further, as illustrated in FIG. 14, the 6 kinds of PRB pattern are identified uniquely by the PRB index A1 of the first PRB pair. Therefore, this PRB index A1 can be used in terms of PRB pattern index.

In FIG. 14, when the enhanced PDCCH set is made up of 4 PRB pairs #3, #9, #15 and #21, the PRB pattern of the enhanced PDCCH set is identified by the PRB pattern index "3" identical to the PRB index of the first PRB pair. In this case, the radio base station notifies the user terminal UE of the 3-bit PRB pattern index "011 ("3" in decimal number)" and 2-bit information "01" indicative of the number n "4" of PRB pairs that make up the enhanced PDCCH set. This notification is performed, for example, by higher layer signaling such as RRC signaling.

Besides, in FIG. 14, the user terminal UE specifies a plurality of PRB pairs that make up the enhanced PDCCH set based on the PRB pattern index, the total number N of PRB pairs that make up the system bandwidth, and number n of PRB pairs that make up the enhanced PDCCH set of which the radio base station notifies the user terminal UE.

Specifically, the user terminal UE calculates the spacing (offset) between PRB pairs based on the number n of PRB pairs that make up the enhanced PDCCH set and the total number N of PRB pairs that make up the system bandwidth. For example, in FIG. 14, the spacing (offset) between PRB pairs is specified by 25/4=6. The user terminal UE specifies the PRB index A1 (=3) of the first PRB pair based on the PRB pattern index "3". The user terminal UE adds the above-mentioned spacing (6) to the PRB index A1 thereby to specify the PRB index A2 (=9) of the second PRB pair. Likewise, the user terminal UE specifies the PRB indexes A3 (=15) and A4 (=21) of the third and fourth PRB pairs.

As described above, the user terminal specifies the PRB indexes A1, A2, A3 and A4 based on the PRB pattern index "3" given from the radio base station and the spacing "6" calculated from the total number N "25" of PRB pairs that make up the system bandwidth and the number n "4" of PRB pairs that make up the enhanced PDCCH set. With this process, the PRB pairs #3, #9, #15 and #21 that make up the enhanced PDCCH set are specified.

According to the radiocommunication method according to the second embodiment, combinations of n (=4) PRB pairs are restricted to those of PRB pairs having equal spacing in the PRB pattern. With this structure, the number of types of PRB pattern is reduced thereby to be able to reduce the number of bits of the PRB pattern index. As a result, as compared with the first embodiment, it is possible to reduce overhead associated with notification of the resource configuration of the enhanced PDCCH set.

Further, in the radio communication method according to the second embodiment, the first PRB index A1 of the PRB pattern is used as the PRB pattern index. Therefore, the radio base station does not have to calculate the PRB pattern index described in the first embodiment. Thus, according to the radio communication method of the second embodiment, it is possible to reduce overhead associated with notification of the resource configuration of the enhanced PDCCH set while reducing complexity of the calculation in the radio base station.

Third Embodiment

Figure 15:
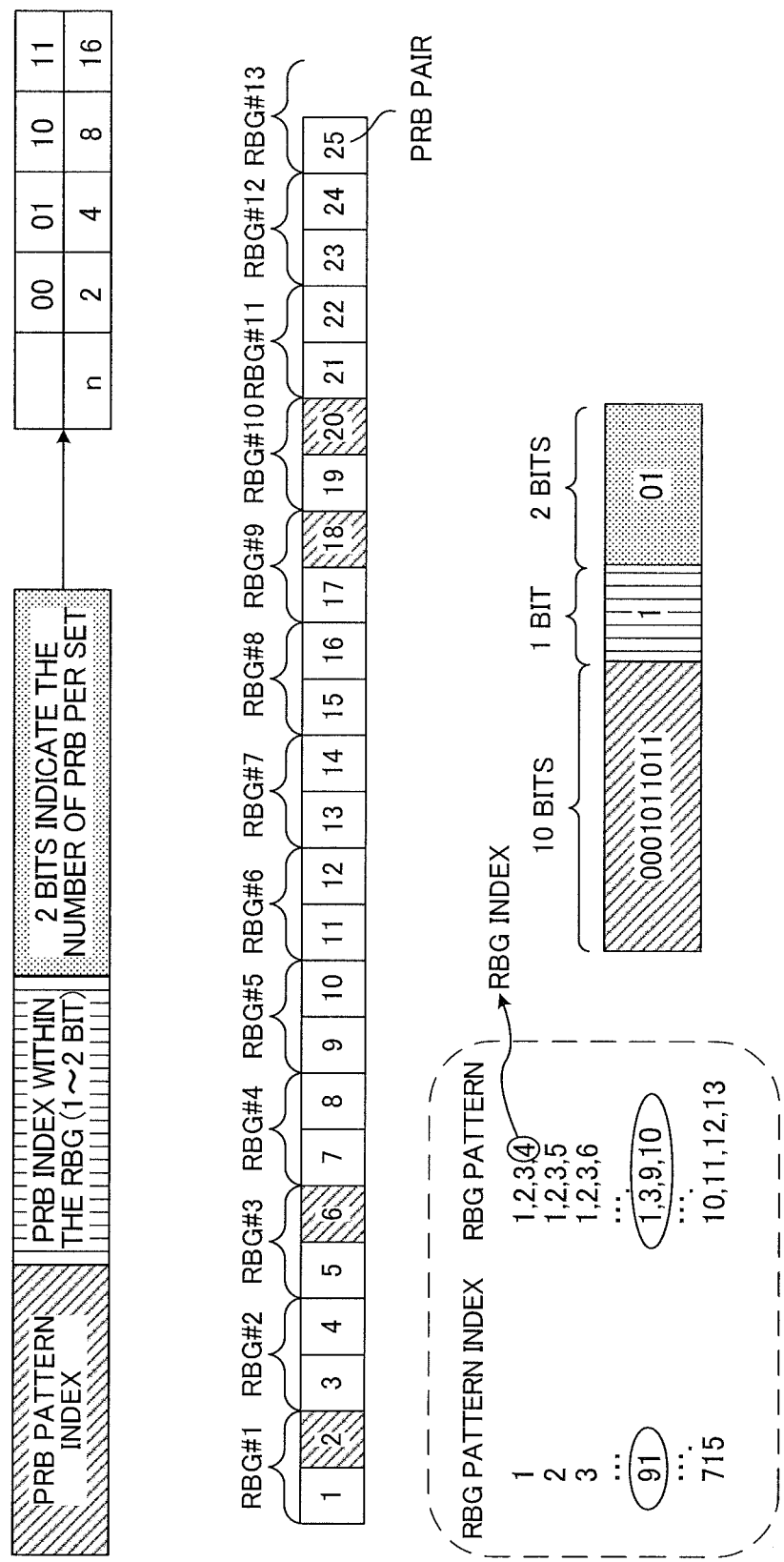
FIG. 15 is a diagram for explaining a radio communication method according to a third embodiment.

With reference to FIG. 15, description is made about a radio communication method according to the third embodiment of the present invention. The radio communication method according to the third embodiment is different from that of the first embodiment in notifying the user terminal UE of an RBG pattern index indicative of an RBG pattern (pattern index) and position information of resource blocks within a resource block group (RBG) instead of the PRB pattern index. Here, the RBG pattern is a combination of a plurality of RBGs including n PRB pairs that make up the enhanced PDCCH set. The following description is made mainly about a difference from the first embodiment.

FIG. 15 is an explanatory diagram of a radio communication method according to the third embodiment. In FIG. 15, one RBG is made up of two PRB pairs that are consecutive in the frequency domain. The number of PRB pairs that make up one RBG is not limited to "2". As illustrated in FIG. 15, when the RBG is made up of two PRB pairs, the total number N of RBGs that make up the system bandwidth is "13" and the 13 RBGs are assigned RBG indexes (e.g., 1 to 13).

As illustrated in FIG. 15, when the total number N of RBGs that make up the system bandwidth is "13" and the number n of PRB pairs that make up the enhanced PDCCH set is "4", the kinds of RBG pattern become equal in number to combinations of four RBGs that are selected from 13 RBGs with no overlap ($=_{13}C_4$ 715). The 715 RBG patterns are assigned with RBG pattern indexes (e.g., 1 to 715) to identify the respective RBG patterns. These 715 RBG patterns are identified uniquely by the 10-bit RBG pattern indexes. Thus, the number of bits of the RBG pattern index (for example, 10 bits) is smaller than the number of bits of the PRB pattern index (for example, 14 bits).

Further, in FIG. 15, when the RBG is made up of two PRB pairs, the position of a resource block in the RBG (for example, first and second positions) is identified by 1-bit position information. Therefore, in FIG. 15, even when the 1-bit position information is added to the 10-bit RBG pattern index, it is possible to reduce the number of bits as compared with the 14-bit PRB pattern index. Here, if one RBG is made up of three or more PRB pairs, position information of 2 or more bits may be used.

In the radio communication method according to the third embodiment, the radio base station may calculate the RBG pattern index using the above-mentioned equation (1). Then, N in the above-mentioned equation (1) is the total number of RBGs that make up the system bandwidth. n is the number of PRB pairs that make up the enhanced PDCCH set. Ai (1≤i≤n) is the RBG index of the i-th RBG in the RBG pattern.

In the radio communication method according to the third embodiment, the user terminal UE specifies the i-th RBG index Ai (1≤i≤n) in the RBG pattern based on the RBG pattern index, the total number N of RBGs that make up the system bandwidth and the number n of PRB pairs that make up the enhanced PDCCH set, and also specifies a plurality of PRB pairs that make up the enhanced PDCCH set based on the above-mentioned position information and the RBG index Ai (1≤i≤n).

To be more specific, the user terminal UE specifies the RBG indexes A1, A2, A3, ... that meet the above-mentioned equations (2-1), (2-2), (2-3), ... , respectively. The user terminal UE specifies the first, second, third, ... PRB pairs that make up the enhanced PDCCH set based on the specified RBG indexes A1, A2, A3, ... , and the position information of the PRB pair in each RBG.

According to the radio communication method of the third embodiment, the user terminal UE is notified of the RBG pattern index that is smaller in number of bits than the PRB pattern index and position information of a PRB pair in each RBG. With this structure, it is possible to reduce overhead associated with notification of the resource configuration of the enhanced PDCCH set as compared with the first embodiment.

Fourth Embodiment

Figure 16:
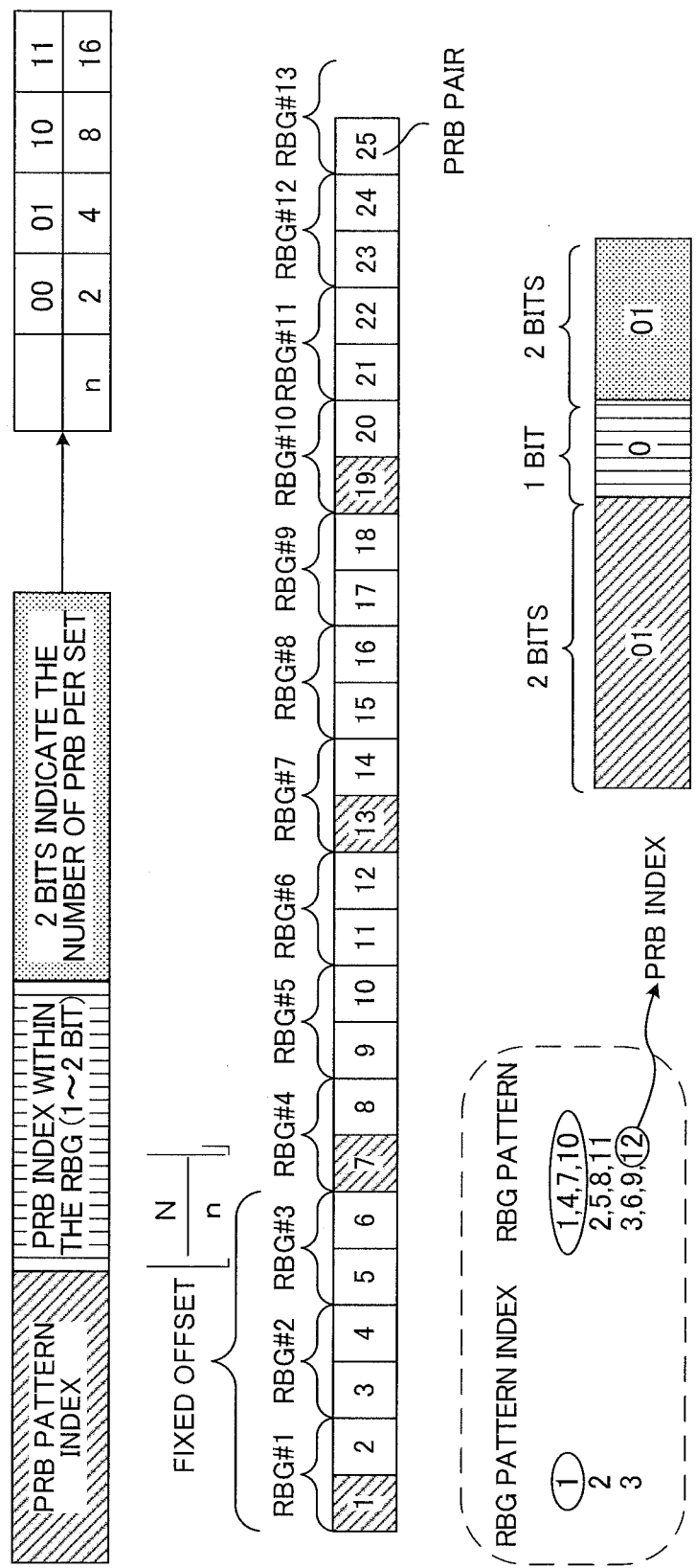
FIG. 16 is a diagram for explaining a radio communication method according to a fourth embodiment.

With reference to FIG. 16, description is made about a radio communication method according to the fourth embodiment of the present invention. The radio communication method according to the fourth embodiment is same as that of the third embodiment in notifying the user terminal UE of an RBG pattern index and position information of a PRB pair in each RBG. However, the radio communication method according to the fourth embodiment is different from that of the third embodiment in that the RBG pattern is restricted to a combination of n RBGs that are arranged with equal spacing. The following description is made mainly about a difference from the third embodiment.

FIG. 16 is an explanatory diagram of the radio communication method according to the fourth embodiment. As illustrated in FIG. 16, when the total number N of RBGs that make up the system bandwidth is "13", the number n of PRB pairs that make up the enhanced PDCCH set is "4", and a combination of 4 RBGs is selected from 13 RBGs with no overlap, there are found $_NC_n$ ($=_{13}C_4$=715) kinds of combination. Here, if the RBG pattern is restricted to combinations of n (=4) RBGs that are arranged with equal spacing, the number of kinds of RBG pattern is reduced thereby to reduce the number of bits of the RBG pattern index.

For example, in FIG. 16, the RBG pattern is restricted to combination of n (=4) RBGs that are arranged with predetermined spacing. The predetermined spacing is, for example, determined based on N/n (=13/4). As described above, N is the total number of RBGs that make up the system bandwidth and n is the number of PRB pairs that make up the enhanced PDCCH set. In this case, there are three kinds of RBG pattern as illustrated in FIG. 16, and they are identified uniquely by 2-bit RBG pattern indexes.

In addition, in the case illustrated in FIG. 16, the three kinds of RBG pattern are identified uniquely by the RBG index A1 of the first RBG. Therefore, the RBG index A1 can be used as RBG pattern index.

In the case illustrated in FIG. 16, the radio base station notifies the user terminal UE of 2-bit RBG pattern index "01 ("1" in decimal number)", 2-bit information "01" indicating the number n "4" of PRB pairs that make up the enhanced PDCCH set and 1-bit position information "0" indicative of the first position of the PRB in the RBG. This notification is made, for example by higher layer signaling such as RRC signaling.

Further, in the case illustrated in FIG. 16, the user terminal UE specifies the RBG index Ai (1≤i≤n) based on the RBG pattern index, the total number N of RBGs that make up the system bandwidth, and the number n of PRB pairs that make up the enhanced PDCCH set given from the radio base station, and also specifies a plurality of PRB pairs that make up the enhanced PDCCH set based on the RBG index Ai (1≤i≤n) and the above-mentioned position information.

Specifically, the use terminal calculates out the spacing between RBGs (offset) "3" based on a result of dividing the total number N of RBGs "13" by the number n of PRB pairs "4". The user terminal UE specifies the RBG index A1 (=1) of the first RBG by the PRB pattern index "1". In addition, the user terminal UE adds the above-mentioned spacing (offset) "3" to the RBG index A1 thereby to specify the RBG index A2 (=4) of the second RBG. In the same way, the user terminal UE specifies the RBG indexes A3 (=7) and A4 (=10) of the third and fourth RBGs. Then, based on the above-mentioned position information, the user terminal UE specifies the first PRB pairs #1, #7, #13, #19 in the RBGs #1, #4, #7, #10, respectively.

According to the radio communication method of the fourth embodiment, combinations of n (=4) RBGs are restricted to those of RBGs having equal spacing. With this structure, as the number of kinds of RBG pattern is reduced thereby to be able to reduce the number of bits of RBG pattern index. As a result, it is possible to reduce overhead associated with notification of the resource configuration of the enhanced PDCCH set as compared with the third embodiment.

Further, in the radio communication method according to the fourth embodiment, the RBG index A1 of the first RBG in the RBG pattern is used in terms of RBG pattern index. Therefore, the radio base station does not have to perform calculation of the RBG pattern index as described in the third embodiment. Consequently, in the radio communication method according to the fourth embodiment, it is possible to reduce overhead associated with notification of the resource configuration of the enhanced PDCCH set while reducing complexity of calculation in the radio base station.

Next description is made in detail about a radio communication system according to the present embodiment. This radio communication system is applied with the radio communication method according to the first to fourth embodiments described above.

(Radio Communication System Configuration)

Figure 17:
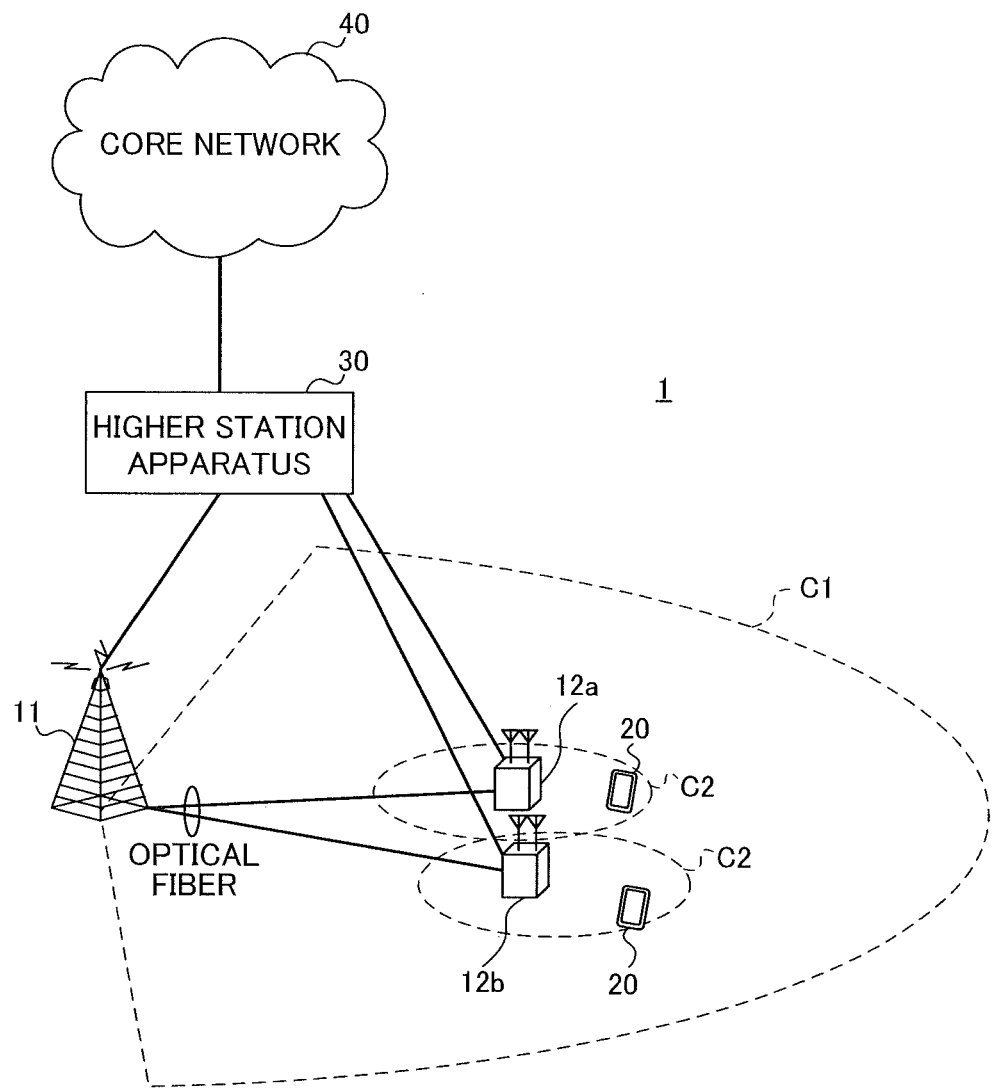
FIG. 17 is a diagram for explaining the system configuration of a radio communication system according to the present embodiment.

FIG. 17 is a diagram schematically illustrating the configuration of a radio communication system according to the present embodiment. The radio communication system illustrated in FIG. 17 is the LTE system or a system including SUPER 3G. In this radio communication system, carrier aggregation is adopted such that a plurality of basic frequency blocks (component carriers) are aggregated, each of the basic frequency blocks being a unit of a system band of the LTE system. In addition, this radio communication system may be called IMT-Advanced, 4G or FRA (Future Radio Access).

As illustrated in FIG. 17, the radio communication system 1 includes a radio base station 11 that forms a macro cell C1 and radio base stations 12a and 12b that are arranged within the macro cell C1 and each form a smaller cell C2 than the macro cell C1. User terminals 20 are arranged in the macro cell C1 and the small cells C2. Each user terminal 20 is configured to be able to perform radio communication with both of the radio base station 11 and the radio base stations 12.

Between the user terminal 20 and the radio base station 11, communication is performed using carrier of a relatively low frequency band (for example, 2 GHz) and wide bandwidth (which may be called existing carrier, Legacy carrier or the like). On the other hand, between the user terminal 20 and the radio base stations 12, communication is performed using carrier of a relatively high frequency band (for example, 3.5 GHz) and narrow bandwidth or using the same carrier as communication with the radio base station 11. The radio base station 11 and each radio base station 12 are connected wiredly or wirelessly to each other.

Each of the radio base station 11 and the radio base stations 12 is connected to a higher station apparatus 30 and then to a core network 40 via the higher station apparatus 30. For example, the higher station apparatus include, but is not limited to, an access gateway apparatus, a radio network controller (RNC), a mobility management entity (MME). Each radio base station 12 may be connected to the higher station apparatus via the radio base station 11.

Here, the radio base station 11 is a radio base station having a relatively wide coverage and may be called eNodeB, a radio base station apparatus, a transmission point or the like. The radio base station 12 is a radio base station having a local coverage and may be called a Pico base station, a femto base station, Home eNodeB, RRH (Remote Radio Head), a micro base station, a transmission point, or the like. In the following description, the radio base stations 11 and 12 are called radio base stations 10, unless they are distinguished from each other. Each user terminal 20 is a terminal supporting various communication schemes of LTE, LTE-A and the like, and may include not only a mobile communication terminal, but also a fixed communication terminal.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

Here, description is made about communication channels used in the radio communication system illustrated in FIG. 17. The downlink communication channel includes a PDSCH (Physical Downlink Shared CHannel) used by each user terminal 20 on a shared basis, and downlink L1/L2 control channels (PDCCH, PCFICH, PHICH, enhanced PDCCH). PDSCH is used to transmit higher control information and user data. PDCCH (Physical Downlink Control Channel) is used to transmit scheduling information of PUSCH and PDSCH and the like. PCFICH (Physical Control Format Indicator Channel) is used to transmit OFDM symbol number used in PDCCH PHICH (Physical Hybrid-ARQ Indicator Channel) is used to transmit ACK/NACK of HARQ of PUSCH. And, the enhanced PDCCH (also called Enhanced Physical Downlink Control Channel, ePDCCH, E-PDCCH, FDM-based PDCCH) may be used to transmit PDSCH and PUSCH scheduling information and the like. This enhanced PDCCH (enhanced downlink control channel) is frequency-division-multiplexed with PDSCH (downlink shared data channel) and is used to compensate for insufficient capacity of the PDCCH.

The uplink communication channels include a PUSCH (Physical Uplink Shared Channel), which is an uplink data channel used by each user terminal 20 on a shared basis, and a PUCCH (Physical Uplink Control Channel), which is an uplink control channel. This PUSCH is used to transmit user data and higher control information. The PUCCH is used to transmit downlink radio quality information (CQI: Channel Quality Indicator), ACK/NACK, and so on.

Figure 18:
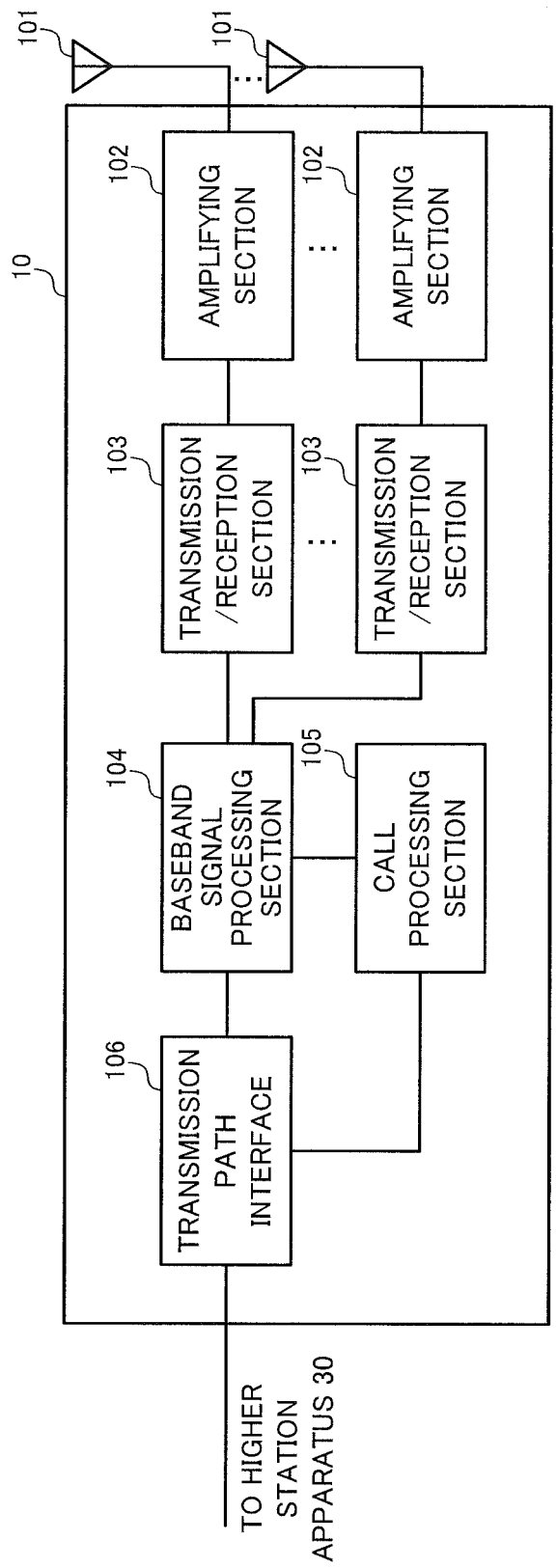
FIG. 18 is a diagram for explaining an overall configuration of a radio base station according to the present embodiment.

FIG. 18 is a diagram of an overall configuration of the radio base station 10 (including the radio base stations 11 and 12) according to the present embodiment. The radio base station 10 has a plurality of transmission/reception antennas 101 for MIMO transmission, amplifying sections 102, transmission/reception sections 103, a baseband signal processing section 104, a call processing section 105 and a transmission path interface 106.

User data that is transmitted on the downlink from the radio base station 10 to the user terminal 20 is input from the higher station apparatus 30, through the transmission path interface 106, into the baseband signal processing section 104.

In the baseband signal processing section 104, signals are subjected to PDCP layer processing, RLC (Radio Link Control) layer transmission processing such as division and coupling of user data and RLC retransmission control transmission processing, MAC (Medium Access Control) retransmission control, including, for example, HARQ transmission processing, scheduling, transport format selection, channel coding, inverse fast Fourier transform (IFFT) processing, and precoding processing. Then, the resultant signals are transferred to each transmission/reception section 103. As for signals of the downlink control channel, transmission processing is performed, including channel coding and inverse fast Fourier transform, and the resultant signals are transmitted to each transmission/reception section 103.

Also, the baseband signal processing section 104 notifies each user terminal 20 of control information for communication in the cell by a broadcast channel. Information for communication in the cell includes, for example, uplink or downlink system bandwidth and so on.

In each transmission/reception section 103, baseband signals which are precoded per antenna and output from the baseband signal processing section 104 are subjected to frequency conversion processing into a radio frequency band. The amplifying section 102 amplifies the radio frequency signals having been subjected to frequency conversion, and the resultant signals are transmitted from the transmission/reception antenna 101.

Meanwhile, as for data to be transmitted on the uplink from the user terminal 20 to the radio base station 10, radio frequency signals are received in each transmission/reception antenna 101, amplified in the amplifying section 102, subjected to frequency conversion and converted into baseband signals in the transmission/reception section 103, and are input to the baseband signal processing section 104.

The baseband signal processing section 104 performs FFTprocessing, IDFT processing, error correction decoding, MAC retransmission control reception processing, and RLC layer and PDCP layer reception processing on the user data included in the received baseband signals. Then, the resultant signals are transferred to the higher station apparatus 30 through the transmission path interface 106. The call processing section 105 performs call processing such as setting up and releasing a communication channel, manages the state of the radio base station 10 and manages the radio resources.

Figure 19:
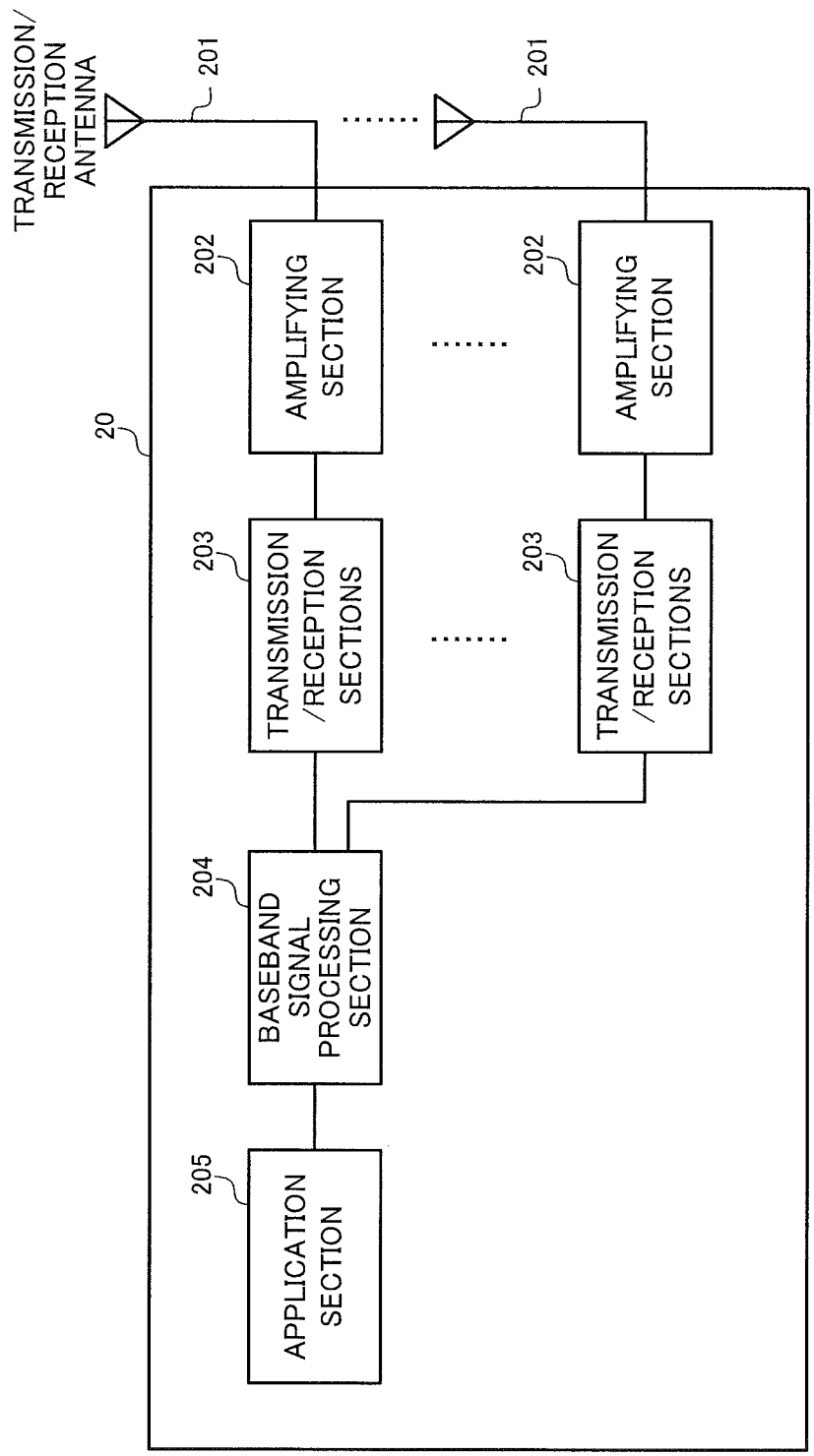
FIG. 19 is a diagram for explaining an overall configuration of a user terminal according to the present embodiment.

FIG. 19 is a diagram of an overall configuration of the user terminal 20 according to the present embodiment. The user terminal 20 has a plurality of transmission/reception antennas 201 for MIMO transmission, amplifying sections 202, transmission/reception sections (reception section) 203, a baseband signal processing section 204 and an application section 205.

As for downlink data, radio frequency signals received in the transmission/reception antennas 201 are amplified in the respective amplifying sections 202, and subjected to frequency conversion into baseband signals in the transmission/reception sections 203. These baseband signals are subjected to reception processing such as FFT processing, error correction decoding and retransmission control and so on, in the baseband signal processing section 204. In this downlink data, downlink user data is transferred to the application section 205. The application section 205 performs processing related to higher layers above the physical layer and the MAC layer. In the downlink data, broadcast information is also transferred to the application section 205.

On the other hand, uplink user data is input from the application section 205 to the baseband signal processing section 204. In the baseband signal processing section 204, retransmission control (H-ARQ: Hybrid ARQ) transmission processing, channel coding, precoding, DFT processing, IFFT processing and so on are performed, and the resultant signals are transferred to each transmission/reception section 203. In the transmission/reception section 203, the baseband signals output from the baseband signal processing section 204 are converted into a radio frequency band. After that, the frequency-converted radio frequency signals are amplified in the amplifying section 202, and then, transmitted from the transmission/reception antenna 201.

Figure 20:
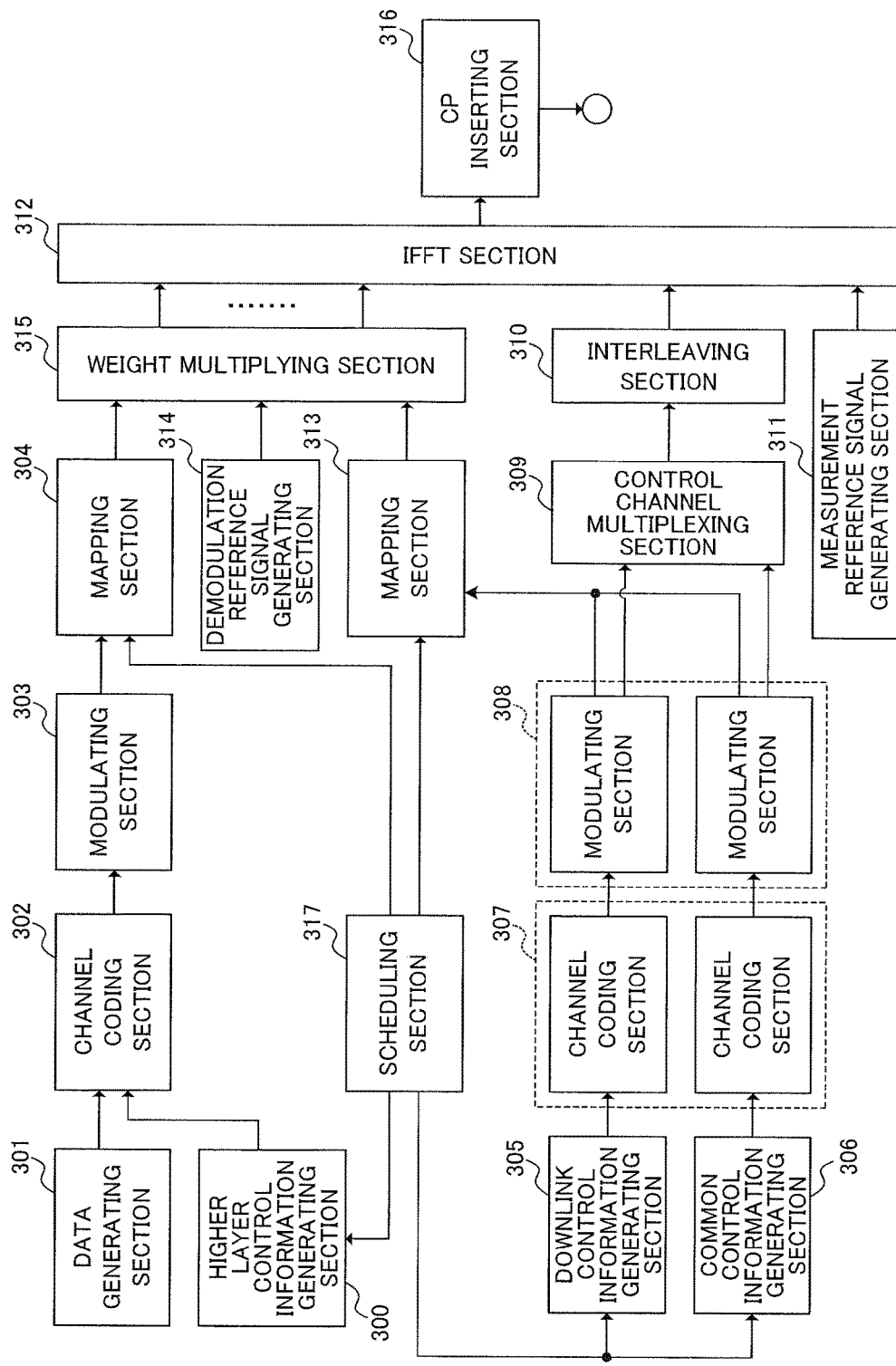
FIG. 20 is a diagram illustrating the functional structure of a baseband signal processing section of the radio base station according to the present embodiment and a part of higher layers.

FIG. 20 is a diagram illustrating a functional structure of the baseband signal processing section 104 of the radio base station 10 according to the present embodiment and a part of the higher layer. The functional structure in FIG. 20 is mainly for downlink (transmission), however the radio base station 10 may also have a functional structure for uplink (reception).

As illustrated in FIG. 20, the radio base station has a higher layer control information generating section 300, a data generating section 301, a channel coding section 302, a modulating section 303, a mapping section 304, a downlink control information generating section 305, a common control information generating section 306, a channel coding section 307, a modulating section 308, a control channel multiplexing section 309, an interleaving section 310, a measurement reference signal generating section 311, an IFFT section 312, a mapping section 313, a demodulation reference signal generating section 314, a weight multiplying section 315, a CP inserting section 316, a scheduling section 317. Here, if the radio base station 10 is the radio base station 12 that forms a small cell C2, the control channel multiplexing section 309 and the interleaving section 310 may be omitted.

The higher layer control information generating section 300 generates higher layer control information for each user terminal 20. The higher layer control information is control information signaled by higher layer (for example, RRC signaling), and includes, for example, pattern information (described later).

The data generating section 301 generates downlink user data per user terminal 20. The downlink user data generated in the data generating section 301 and higher layer control information generated in the higher layer control information generating section 300 are input to the channel coding section 302 as downlink data to be transmitted via PDSCH. The channel coding section 302 performs channel coding on downlink data for each user terminal 20 in accordance with a coding rate that is determined based on feedback information from the user terminal 20. The modulating section 303 modulates the channel-coded downlink data in accordance with a modulation scheme that is determined based on the feedback information from the user terminal 20. The mapping section 304 maps the modulated downlink data in accordance with instructions from the scheduling section 317.

The downlink control information generating section 305 generates UE-specific downlink control information (DCI) for each user terminal 20. The UE-specific downlink control information includes PDSCH assignment information (DL grant), PUSCH assignment information (UL grant) and the like. The common control information generating section 306 generates cell-specific common control information.

The downlink control information generated in the downlink control information generating section 305 and the common control information generated in the common control information generating section 306 are input to the channel coding sections 307 as downlink control information to be transmitted via PDCCH or enhanced PDCCH. The channel coding section 307 performs channel coding on the input downlink control information in accordance with coding rate instructed from the scheduling section 317 described later. The modulating section 308 modulates the channel-coded downlink control information in accordance with the modulation scheme instructed from the scheduling section 317.

Note that the downlink control information to be transmitted via PDCCH is input from the modulating sections 308 to the control channel multiplexing section 309 and is then multiplexed. The downlink control information multiplexed in the control channel multiplexing section 309 is interleaved in the interleaving section 310. The interleaved downlink control information is input, together with measurement reference signals (CSI-RS: Channel State Information-Reference Signal, CRS: Cell specific Reference Signal etc.) generated in the measurement reference signal generating section 311, to the IFFT section 312.

On the other hand, the downlink control information to be transmitted via the enhanced PDCCH is input from the modulating sections 308 to the mapping section 313. The mapping section 313 maps the downlink control information in predetermined allocation unit (for example, in eCCE unit or in eREG unit) in accordance with instructions from the scheduling section 317 (described later). The mapping section 313 may map downlink control information by distributed mapping or localized mapping in accordance with the instructions from the scheduling section 317.

The mapped downlink control information is input to the weight multiplying section 315, together with downlink data to be transmitted via the PDSCH (that is, downlink data mapped in the mapping section 304) and the demodulation reference signals (DM-RS) generated in the demodulation reference signal generating section 314. The weight multiplying section 315 multiplies the downlink data to be transmitted via the PDSCH, downlink control information to be transmitted via the enhanced PDCCH and the demodulation reference signals by precoding weights specific to the user terminal 20 and performs precoding thereon. The precoded transmission data is input to the IFFT section 312, subjected to inverse fast Fourier transform and converted from frequency domain signals to time-series signals. The signals output from the IFFT section 312 are then applied with cyclic prefix (CP) that serves as a guard interval in the CP inserting section 316 and then, the signals are output to the transmission/reception sections 103.

The scheduling section 317 performs scheduling of downlink user data to be transmitted on the PDSCH, downlink control information to be transmitted on the enhanced PDCCH and downlink control information to be transmitted on the PDCCH. Specifically, the scheduling section 317 allocates radio resources based on the feedback information from each user terminal 20 (for example, CSI (Channel State Information) including RI (Rank Indicator), CQI (Channel Quality Indicator) and the like) and instruction information from the higher station apparatus 30.

In the present embodiment, the scheduling section 317 configures a plurality of enhanced PDCCH sets (resource sets) for each user terminal 20. Besides, the scheduling section 317 constitutes a configuring section of the present invention. The scheduling section 317 determines a plurality of PRB pairs that make up each of the enhanced PDCCH sets. The scheduling section 317 may determine a plurality of resource block groups (RBGs) including the PRB pairs.

Further, in the present embodiment, the higher layer control information generating section 300 generates information indicating pattern information of a plurality of PRB pairs that make up an enhanced PDCCH set and the number (n) of PRB pairs that make up the enhanced PDCCH set. The information indicating pattern information and the number (n) of PRB pairs that make up the enhanced PDCCH set is signaled to the user terminal 20 by higher layer signaling (e.g., RRC signaling). The higher layer control information generating section 300 and the transmission/reception sections 103 constitute a notifying section.

Furthermore, the pattern information may be a PRB pattern index (pattern index) indicating a PRB pattern (resource block pattern) that is a combination of a plurality of PRB pairs determined by the scheduling section 317 (first and second embodiments). The PRB pattern index may be, for example, calculated by the equation (1) (first embodiment). If the PRB pattern is restricted to combinations of n PRB pairs that are arranged with equal spacing, the PRB pattern index may be the PRB index of the first PRB pair in the PRB pattern (second embodiment).

The pattern information may include an RBG pattern index (pattern index) indicating an RBG pattern that is a combination of a plurality of RBGs determined by the scheduling section 317 and position information of the PRB pair in each RBG (third and fourth embodiments). The RBG pattern index may be, for example, calculated by the equation (1) (third embodiment). If the RBG pattern is restricted to combinations of n RBGs that are arranged with equal spacing, the RBG pattern index may be the RBG index of the first RBG in the RBG pattern (fourth embodiment).

Figure 21:
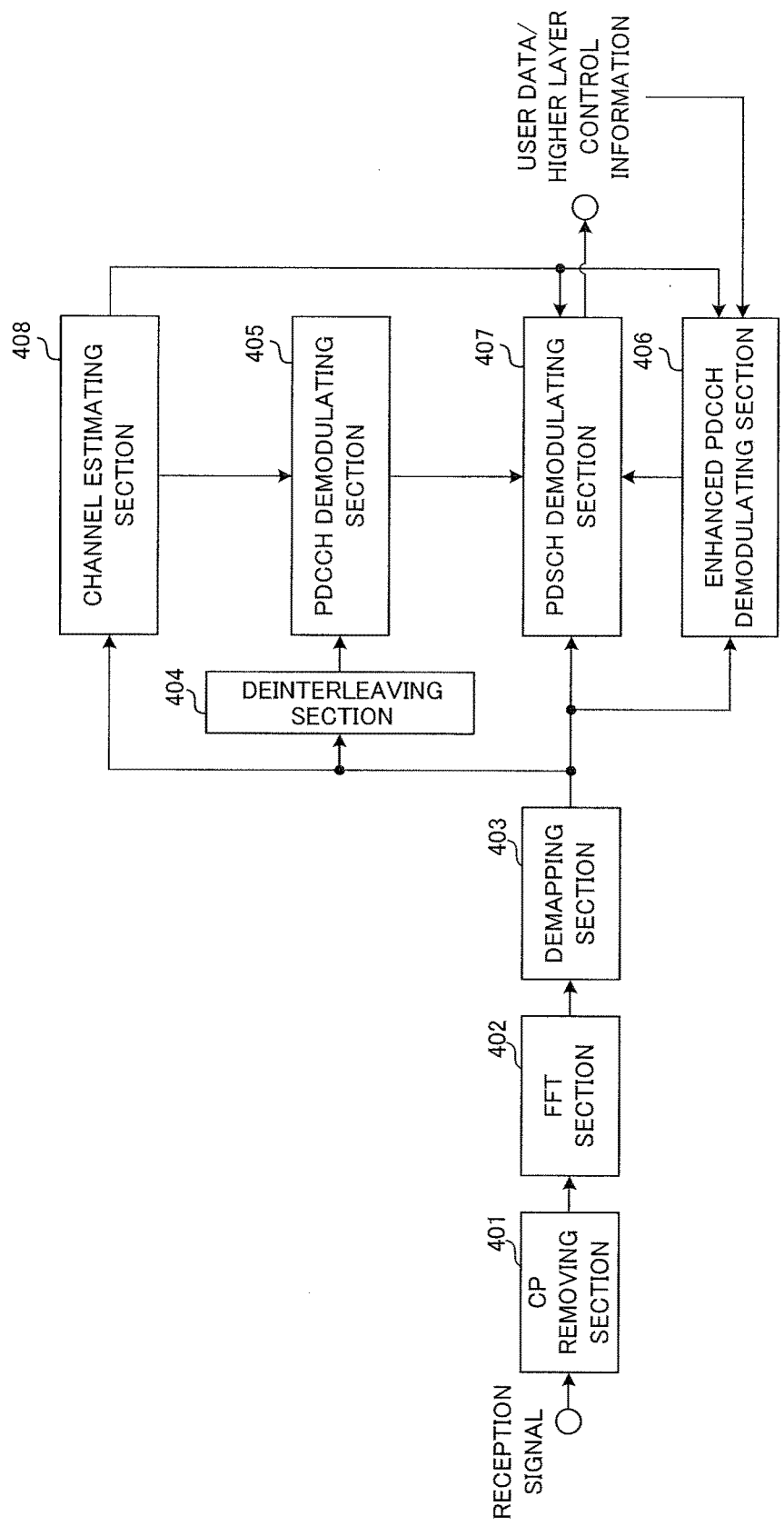
FIG. 21 is a diagram illustrating the functional structure of a baseband signal processing section of the user terminal according to the present embodiment.

FIG. 21 is a diagram illustrating a functional structure of the baseband signal processing section 204 of the user terminal 20. The user terminal 20 has, as the functional structure for downlink reception, a CP removing section 401, an FFT section 402, a demapping section 403, a deinterleaving section 404, a PDCCH demodulating section 405, an enhanced PDCCH demodulating section 406, a PDSCH demodulating section 407 and a channel estimating section 408.

Downlink signals received as reception data from the radio base station 10 are input to the CP removing section 401, where the cyclic prefix (CP) is removed. The CP-removed downlink signals are input to the FFT section 402. The FFT section 402 performs fast Fourier transform (FFT) on the downlink signals and converts them from the time domain signals to the frequency domain signals, and the resultant signals are then input to the demapping section 403. The demapping section 403 demaps the downlink signals. The demapping processing by the demapping section 403 is performed based on the higher layer control information input from the application section 205. The downlink control information output from the demapping section 403 is deinterleaved in the deinterleaving section 404.

The PDCCH demodulating section 405 performs blind decoding, demodulating, channel decoding and the like on the downlink control information (DCI) output from the deinterleaving section 404, based on a channel estimation result by the channel estimating section 408 described later.

The enhanced PDCCH demodulating section 406 performs blind decoding, demodulating, channel decoding and the like on the downlink control information (DCI) output from the demapping section 403, based on the channel estimation result by the channel estimating section 408 (described later).

The PDSCH demodulating section 407 performs demodulation, channel decoding and the like of downlink data output from the demapping section 403, based on the channel estimation result by the channel estimating section 408 (described later). Specifically, the PDSCH demodulating section 407 demodulates PDSCH assigned to the user terminal based on the downlink control information demodulated in the PDCCH demodulating section 405 or the enhanced PDCCH demodulating section 406 to acquire downlink data directed to the user terminal (downlink user data and higher layer control information).

The channel estimating section 408 performs channel estimation (channel measurement) using demodulation reference signals (DM-RS), measurement reference signals (CRS, CSI-RS) and the like. The channel estimating section 408 outputs a channel estimation result based on the measurement reference signal (CRS, CSI-RS) to the PDCCH demodulating section 405. On the other hand, the channel estimating section 408 outputs the channel estimation result based on the demodulation reference signal (DM-RS) to the PDSCH demodulating section 407 and the enhanced PDCCH demodulating section 406. Due to demodulation using the demodulation reference signal (DM-RS) specific to the user terminal 20, it is possible to enjoy beamforming gains for the PDSCH and enhanced PDCCH.

In the present embodiment, the enhanced PDCCH demodulating section 406 specifies a plurality of PRB pairs that make up the an enhanced PDCCH set based on higher layer control information (here, pattern information and the number (n) of PRB pairs that make up the enhanced PDCCH set) input from the PDSCH demodulating section 407. The enhanced PDCCH demodulating section 406 performs blind decoding on the specified PRB pairs to obtain downlink control information. The enhanced PDCCH demodulating section 406 constitutes a specifying section of the present invention.

Further, in the present embodiment, the enhanced PDCCH demodulating section 406 specifies PRB indexes (indexes) (Ai (1≤i≤n)) assigned to the plural PRB pairs in the PRB pattern (resource block pattern) based on the PRB pattern index (pattern index), the total number (N) of PRBs that make up the system bandwidth and the number (n) of PRB pairs that make up the enhanced PDCCH set (first and second embodiments).

For example, the enhanced PDCCH demodulating section 406 may specify the PRB indexes (Ai (1≤i≤n)) using the equations (2-1), (2-2), (2-3), . . . (first embodiment). Further, when the PRB pattern is restricted to combinations of n PRB pairs that are arranged with equal spacing, the enhanced PDCCH demodulating section 406 may specify the PRB indexes (Ai (1≤i≤n)) using the spacing between the PRB pairs (e.g., N/n) and the PRB pattern index (second embodiment).

Furthermore, in the present embodiment, the enhanced PDCCH demodulating section 406 specifies RBG indexes (indexes) (Ai (1≤i≤n)) assigned to a plurality of RBGs in an RBG pattern based on the RBG pattern index (pattern index), the total number (N) of RBGs that make up the system bandwidth and the number (n) of PRB pairs that make up the enhanced PDCCH set (first and second embodiments). And, the enhanced PDCCH demodulating section 406 may specify the plural PRB pairs that make up the enhanced PDCCH set based on the RBG indexes (Ai (1≤i≤n)) and the position information of the PRB pair in each RBG (third and fourth embodiments).

For example, the enhanced PDCCH demodulating section 406 may specify the RBG indexes (Ai (1≤i≤n)) using the equations (2-1), (2-2), (2-3), . . . (third embodiment). Further, when the RBG pattern is restricted to combinations of n RBGs that are arranged with equal spacing, the enhanced PDCCH demodulating section 406 may specify the RBG indexes (Ai (1≤i≤n)) using the spacing between the RBGs (e.g., N/n) and the RBG pattern index (fourth embodiment).

As described up to this point, according to the radio communication system 1 of the present embodiment, the radio base station has only to notify the user terminal of pattern information of a plurality of PRB pairs that make up an enhanced PDCCH set and information indicating the number n of PRB pairs that make up the enhanced PDCCH set so that the user terminal UE can specify the PRB pairs that make up the enhanced PDCCH set. Therefore, it is possible to reduce overhead associated with notification of the resource configuration of the enhanced PDCCH set.

Up to this point, the present invention has been described in detail by way of the above-described embodiments. However, a person of ordinary skill in the art would understand that the present invention is not limited to the embodiments described in this description. The present invention could be embodied in various modified or altered forms without departing from the gist or scope of the present invention defined by the claims. Therefore, the statement in this description has been made for the illustrative purpose only and not to impose any restriction to the present invention.

The disclosure of Japanese Patent Application No. 2012-243062 filed on Nov. 2, 2012, including the specification, drawings, and abstract, is incorporated herein by reference in its entirety.

The invention claimed is:

1. A radio base station that transmits downlink control information for a user terminal using an enhanced downlink control channel frequency-division-multiplexed with a downlink shared data channel, the radio base station comprising:
   a processor that configures the user terminal with a resource set including a plurality of resource blocks allocated to the enhanced downlink control channel; and
   a transmitter that transmits, to the user terminal a pattern index indicating a resource block pattern that is a sequence of the resource blocks that are included in the resource set and information indicating a number (n) of resource blocks that are included in the resource set,
   wherein the pattern index is calculated based on a total number (N) of resource blocks that are included in a downlink bandwidth, the number (n) of resource blocks and indexes (Ai (1≤i≤n)) assigned to the resource blocks in the resource block pattern.

2. The radio base station according to claim 1, wherein the transmitter transmits, to the user terminal, the pattern index and the number (n) of resource blocks by higher layer signaling.

3. A user terminal that receives downlink control information from a radio base station using an enhanced downlink control channel frequency-division-multiplexed with a downlink shared data channel, the user terminal comprising:
   a receiver that, when the user terminal is configured with a resource set including a plurality of resource blocks allocated to the enhanced downlink control channel, receives, from the radio base station, a pattern index indicating a resource block pattern that is a sequence of the resource blocks that are included in the resource set and information indicating a number (n) of resource blocks that are included in the resource set,
   wherein the pattern index is calculated based on a total number (N) of resource blocks that are included in a downlink bandwidth, the number (n) of resource blocks and indexes (Ai (1≤i≤n)) assigned to the resource blocks in the resource block pattern.

4. A radio communication method in which a radio base station transmits downlink control information for a user terminal using an enhanced downlink control channel frequency-division-multiplexed with a downlink shared data channel, the radio communication method comprising the steps of:

by the radio base station, configuring the user terminal with a resource set including a plurality of resource blocks allocated to the enhanced downlink control channel; and transmitting, to the user terminal, a pattern index indicating a resource block pattern that is a sequence of the resource blocks that are included in the resource set and information indicating a number (n) of resource blocks that are included in the resource set, wherein the pattern index is calculated based on a total number (N) of resource blocks that are included in a downlink bandwidth, the number (n) of resource blocks and indexes (Ai ($1 \leq i \leq n$)) assigned to the resource blocks in the resource block pattern.

5. The radio base station according to claim 1, wherein the transmitter transmits, to the user terminal, the pattern index and the information indicating the number (n) of resource blocks by higher layer signaling.

6. The user terminal according to claim 3, wherein the receiver receives the pattern information and the information indicating the number (n) of resource blocks by higher layer signaling.

7. The user terminal according to claim 3, wherein the receiver receives the pattern information and the information indicating the number (n) of resource blocks by higher layer signaling.

* * * * *